(12) United States Patent
Wanker

(10) Patent No.: US 8,204,797 B2
(45) Date of Patent: Jun. 19, 2012

(54) CUSTOMIZABLE ELECTRONIC COMMERCE COMPARISON SYSTEM AND METHOD

(76) Inventor: William Paul Wanker, Santa Fe, NM (US)

( * ) Notice: Subject to any disclaimer, the term of this patent is extended or adjusted under 35 U.S.C. 154(b) by 1243 days.

(21) Appl. No.: 11/871,108

(22) Filed: Oct. 11, 2007

(65) Prior Publication Data

US 2008/0033841 A1 Feb. 7, 2008

Related U.S. Application Data

(62) Division of application No. 09/290,006, filed on Apr. 11, 1999, now Pat. No. 7,302,429.

(51) Int. Cl.
  *G06Q 30/00* (2006.01)
(52) U.S. Cl. ............... 705/26.64; 705/26.1; 705/26.61; 705/26.62; 705/26.63
(58) Field of Classification Search ......... 705/26.1–27.2
  See application file for complete search history.

(56) References Cited

U.S. PATENT DOCUMENTS

| | | | |
|---|---|---|---|
| 5,085,529 A | 2/1992 | McGourty et al. | |
| 5,194,828 A | 3/1993 | Kato et al. | |
| 5,366,307 A | 11/1994 | McGourty et al. | |
| 5,539,652 A | 7/1996 | Tegethoff | |
| 5,550,746 A | 8/1996 | Jacobs | |
| 5,574,828 A | 11/1996 | Hayward et al. | |
| 5,584,016 A | 12/1996 | Varghese et al. | |
| 5,717,730 A | 2/1998 | Prakash et al. | |
| 5,734,890 A | 3/1998 | Case et al. | |
| 5,977,805 A | 11/1999 | Vergnes et al. | |
| 5,991,739 A | 11/1999 | Cupps et al. | |
| 5,999,914 A | 12/1999 | Blinn et al. | |
| 6,081,798 A | 6/2000 | Johnson et al. | |
| 6,115,586 A | 9/2000 | Bezzam et al. | |
| 6,119,079 A | 9/2000 | Wang et al. | |
| 6,167,567 A | 12/2000 | Chiles et al. | |
| 6,199,079 B1 | 3/2001 | Gupta et al. | |
| 6,219,669 B1 | 4/2001 | Haff et al. | |
| 6,236,990 B1 * | 5/2001 | Geller et al. | 1/1 |
| 6,285,999 B1 | 9/2001 | Page | |
| 6,310,498 B1 | 10/2001 | Larsson | |
| 6,311,178 B1 | 10/2001 | Bi et al. | |

(Continued)

OTHER PUBLICATIONS

BizRate.com, BizRate: Making the Web a Safer, Better Place to Shop, copyright 1997, 1998, <http://web.archive.org/web/19981205082910/http://www.bizrate.com/>, pp. 1-39. included in file of parent U.S. Appl. No. 09/290,006 (Patent # 7302429).*

(Continued)

*Primary Examiner* — Michael Misiaszek
(74) *Attorney, Agent, or Firm* — Marger Johnson & McCollom PC

(57) ABSTRACT

In a consumer information system, a method of comparing products and services including providing product specific information, providing merchant specific information on the specified product, providing merchant specific business information, providing product specific information collected by third parties, providing merchant specific information collected by third parties, applying weighting factors to the information provided, producing an aggregate value for each merchant based on the weighting factors as applied to the information provided, and producing a ranking of the merchants offering the specified product based on the aggregate value for each merchant. The system provides for consumers to select a set of standardized weighting factors or to modify the standardized weighting factors or to create their own weighting factors. The system provides detailed information to consumers on the breakdown of factors influencing the rating.

3 Claims, 18 Drawing Sheets

U.S. PATENT DOCUMENTS

| | | |
|---|---|---|
| 6,321,218 B1 | 11/2001 | Guay et al. |
| 6,397,212 B1 | 5/2002 | Biffar |
| 6,434,556 B1 | 8/2002 | Levin et al. |
| 6,512,408 B2 | 1/2003 | Lee et al. |
| 6,526,440 B1 | 2/2003 | Bharat |
| 6,670,833 B2 | 12/2003 | Kurd et al. |
| 6,686,784 B2 | 2/2004 | Chang |
| 6,760,720 B1 | 7/2004 | De Bellis |
| 6,812,797 B1 | 11/2004 | De Veirman et al. |
| 6,829,606 B2 | 12/2004 | Ripley |
| 6,952,124 B2 | 10/2005 | Pham |
| 6,996,561 B2 | 2/2006 | de Hilster et al. |
| 7,003,503 B2 | 2/2006 | Crosby et al. |
| 7,013,323 B1 | 3/2006 | Thomas et al. |
| 7,024,404 B1 | 4/2006 | Gerasoulis et al. |
| 7,035,849 B2 | 4/2006 | Tifft |
| 7,042,253 B2 | 5/2006 | Su et al. |
| 7,173,462 B1 | 2/2007 | Wang |
| 7,249,126 B1 | 7/2007 | Ginsburg et al. |
| 7,302,429 B1 | 11/2007 | Wanker |
| 7,630,919 B1 | 12/2009 | Obrecht |
| 7,945,571 B2 | 5/2011 | Wanker |
| 2002/0055871 A1 | 5/2002 | Gabler |
| 2003/0093338 A1 | 5/2003 | Kim et al. |
| 2003/0140309 A1 | 7/2003 | Saito et al. |
| 2004/0054447 A1 | 3/2004 | Thomas et al. |
| 2004/0186828 A1 | 9/2004 | Yadav et al. |
| 2004/0212410 A1 | 10/2004 | Ghazali et al. |
| 2004/0249713 A1 | 12/2004 | Gross |
| 2005/0013396 A1 | 1/2005 | Kliesner et al. |
| 2005/0071328 A1 | 3/2005 | Lawrence |
| 2005/0114306 A1 | 5/2005 | Shu et al. |
| 2005/0186918 A1 | 8/2005 | Ramet et al. |
| 2005/0192978 A1 | 9/2005 | Lightstone et al. |
| 2006/0071844 A1 | 4/2006 | Wood |
| 2006/0122997 A1 | 6/2006 | Lin |
| 2006/0242193 A1 | 10/2006 | Dunning |
| 2006/0250170 A1 | 11/2006 | Wang |
| 2008/0071638 A1 | 3/2008 | Wanker |
| 2008/0243827 A1 | 10/2008 | Sarma et al. |
| 2009/0138329 A1 | 5/2009 | Wanker |

OTHER PUBLICATIONS

"Take your catalog online" Farmer, Caroline. Success. Chicago: Nov. 1996. vol. 43, Iss. 9; p 60, 1 pp. Retrieved via ProQuest on Feb. 13, 2012.*
"Definition of attitudinal," Merriam-Webster Online Dictionary, downloaded from http://www.m-w.com/dictionary/attitudinal, May 25, 2007, 1 page.
Sherman, Chris, "What's New in Shopping Search," SearchEngineWatch.com, Dec. 9, 2003, downloaded from http://searchenginewatch.com/showPage.html?page=3285871, May 25, 2007, 4 pages.
http://en/wikipedia.org/Weight_function.
http://en/wikipedia.org/Weighted_mean.
Search Engine Watch Dec. 9, 2003—What's New in Shopping BizRate.
http://www.coremetrics.com/news/media/2002/pr02_05_21_bizrate.html.
BizRate.com, BizRate: Making the Web a Safer, Better Place to Shop, copyright 1997, 1998, <http://web.archive.org/web/19981205082910/http://www.bizrate.com/>, pp. 1-39.
BizRate.com, Making the Web a Safer, Better Place to Shop!, <http://web.archive.org/web/19981205082910/http://www.bizrate.com/>, copyright 1997, 1998 Binary Compass Enterprises, pp. 1-29.
Greg Keizer, "Search Engine Shoot out: Top Engines Compared," CNET Special Reports, Jan. 14, 1998, USA.
Greg Keizer, "Browser Search Tips," CNET Special Reports, Jan. 14, 1998, USA.
Greg Keizer, "Guide to Metasearches," CNET Special Reports, Jan. 14, 1998, USA.
Greg Keizer, "Search Engine Ratings," CNET Special Reports, Jan. 14, 1998, USA.
Greg Keizer, "Hotbot," CNET Special Reports, Jan. 14, 1998, USA.
Greg Keizer, "Excite," CNET Special Reports, Jan. 14, 1998, USA.
Greg Keizer, "Infoseek," CNET Special Reports, Jan. 14, 1998, USA.
Greg Keizer, "Lycos," CNET Special Reports, Jan. 14, 1998, USA.
Greg Keizer, "Open Text Index," CNET Special Reports, Jan. 14, 1998, USA.
Greg Keizer, "AltaVista," CNET Special Reports, Jan. 14, 1998, USA.
Harry McCracken, "Where the Buys Are," PC World, Oct. 1998, p. 167-180.
Stephen H. Wildstrom, "Bots' Don't Make Great Shoppers," Business Week, Dec. 7, 1998, p. 14.
David Lidsky, "Home on the Web," PC Magazine, Sep. 1, 1998, p. 101-141.
Nancy Ann Jeffrey, "Who's on First?", Wall Street Journal, Oct. 19, 1998, B5.
S.M., "Off-Web Dickering," Forbes, May 5, 1999, p. 134.
Preston Gralla, "A Buyer's Guide to the Web," Access Internet Magazine, Apr. 1999, p. 6-7.
Kaitlin Quistgaard, "Keeping Up with the Nielsens," Business 2.0, Feb. 1999, p. 63-74.
Daniel F. Spubler, "Clock Wise," Business 2.0, Feb. 1999, p. 82-86.
Rebecca Quick, "Find Anything at Junglee," Wall Street Journal, Mar. 29, 1999, B1-B4.
David Balstone, "Mine Fields," Business 2.0, Apr. 1999, p. 82-86.
Rebecca Quick, "The Attack of the Robots," Wall Street Journal, Dec. 7, 1998, R14.
Co-pending U.S. Appl. No. 11/945,243, filed Nov. 26, 2007.
Notice of Allowance Mailed Mar. 4, 2011 in Co-pending U.S. Appl. No. 11/945,243, filed Nov. 26, 2007.
Non-Final Office Action Mailed Aug. 27, 2010 in Co-pending U.S. Appl. No. 11/945,243, filed Nov. 26, 2007.
Non-Final Office Action Mailed May 13, 2011 in Co-Pending U.S. Appl. No. 11/945,242, field Nov. 26, 2007.
International Search Report PCT/US2007/64564, Dated Feb. 11, 2008, pp. 1-2.
Written Opinion PCT/US2007/64584, Dated Feb. 11, 2008, pp. 1-8.
Co-pending U.S. Appl. No. 11/944,145, filed Nov. 21, 2007.
Co-pending U.S. Appl. No. 11/945,242, filed Nov. 26, 2007.
Co-pending U.S. Appl. No. 11/945,234, filed Nov. 26, 2007.
Notice of Allowance Mailed Sep. 7, 2007 in Co-pending U.S. Appl. No. 09/290,006, filed Apr. 11, 1999.
Final Office Action Mailed Aug. 22, 2008 in Co-pending U.S. Appl. No. 09/290.006, filed Apr. 11, 1999.
Non-Final Office Action Mailed Nov. 16, 2004 in Co-pending U.S. Appl. No. 09/290,006, filed Apr. 11, 1999.
Final Office Action Mailed Mar. 25, 2004 in Co-pending U.S. Appl. No. 09/290,006, field Apr. 11, 1999.
Non-Final Office Action Mailed Oct. 6, 2003 in Co-pending U.S. Appl. No. 09/290,006, filed Apr. 11, 1999.
Non-Final Office Action Mailed Apr. 24, 2002 in Co-pending U.S. Appl. No. 09/290,006, filed Apr. 11, 1999.
Non-Final Office Action Mailed Jul. 18, 2001 in Co-pending U.S. Appl. No. 09/290,006, filed Apr. 11, 1999.
Non-Final Office Action Mailed Jan. 31, 2001 in Co-pending U.S. Appl. No. 09/290,006, filed Apr. 11, 1999.
Non-Final Office Action Mailed Jan. 21, 2010 in Co-pending U.S. Appl. No. 11/945,234, filed Nov. 26, 2007.
Non-Final Office Action Mailed Apr. 24, 2002 in Co-pending U.S. Appl. No. 11/945,234, filed Nov. 26, 2007.
Non-Final Office Action Mailed Apr. 21, 2011 in Co-pending U.S. Appl. No. 11/944,145, filed Nov. 21, 2007.
Non-Final Office Action Mailed Jan. 6, 2012, in Co-pending U.S. Appl. No. 11/945,242, filed Nov. 26, 2007.
Co-pending U.S. Appl. No. 09/290,006, filed Apr. 11, 1999.
Notice of Allowance Mailed Oct. 21, 2011 in Co-pending U.S. Appl. No. 11/948,145 of Wanker, W.P., filed Nov. 21, 2007.

* cited by examiner

CUSTOMIZABLE ELECTRONIC COMMERCE COMPARISON SYSTEM AND METHOD

This is a divisional of U.S. patent application Ser. No. 09/290,006 filed on Apr. 11, 1999.

BACKGROUND OF THE INVENTION

1. Field of the Invention

The present invention relates generally to price comparison and shopping systems, and more particularly, to online comparison-shopping systems.

2. Description of the Related Art

Online shopping systems, or "shop bots," provide consumers with the ability to perform a price comparison for a specific product. A shop bot will search its database for the specified product, the product's price, and a few other pieces of information. The shop bot then returns the results of the query to the user, typically ranking the return results based on the price each merchant specifies for the product. Often the lowest price is given the highest ranking. However, some shop bots limit merchant access to those merchants who have paid the shop bot a fee for being included in their rankings.

Examples of available shop bots include Junglee™ which provides a consumer with the ability to specify a product and receive a search return ranking merchants who list the product as for sale. The ranking is based solely on price of the product.

Another shop bot is MySimon™ which provides a similar search return ranking merchants based on price of the offered goods. Merchants can distinguish themselves from other merchants by purchasing links to the merchants' web site, promotional advertising, or logos.

Still another shop bot is pcOrder.com which provides information on price and compatibility of computer products from affiliated manufacturers and distributors. Several web sites, including "Shop the Web" from Amazon.com do rating and providing recommendations on sites. These sites are limited to ranking based on offered price and do not include the total price to the consumer, including the costs of shipping and handling which can vary widely among different merchants. Some merchants have begun the practice of offering low prices on the product and including high shipping and handling charges. In this manner some merchants have sought to manipulate existing shop bots which only rank based on offered price of the product, and not the total price for the product delivered to the consumer.

Some web sites allow for ranking by consumers. Sites such as Compare.net allow a consumer to select and compare offerings from different merchants or manufacturers, and the consumer may select a ranking button which allows the consumer to respond in survey fashion to which product the consumer would most likely purchase. The disadvantage of such web sites is that they only present data to the consumer and then let the consumer perform the difficult task of making a comparison. In this manner the site does little for the consumer. What the site does do is present and collect survey information for use by merchants and manufacturers.

Another online service aimed at providing consumers with information is BizRate™. Bizrate collects information through consumer questionnaires at the point of purchase and through independent testing. Bizrate uses this information in rating, such as gold or silver, a merchant. The collection of information through point of purchase questionnaires necessitates the cooperation and approval of the merchant. Not surprisingly, merchants who do not score well on these surveys have an incentive not to continue participating.

While some web sites seek to compile information on multiple merchants, other sites provide consumers with information on their specific product. Sites such as those run by Dell™ and Gmbuypower.com help a consumer select a product and see how the customization of the product effects the price, but these sites do not allow for customization of comparing between different merchants offering similar goods. Such sites often present data on their offered product in manner that is most favorable to the merchant or manufacturer. Consumers lack the ability to customize the site to their needs or to rank competing products based on more than just offered price.

Another problem for consumers in using the available web sites is the affiliation, whether made known to the consumer or not, of the web site with the merchant or manufacturer. Advertising and licensing are major revenue sources for many web sites from portals to shop bots. Merchants or manufacturers pay for more prominent placement in search returns and rankings. Some sites only search or rank merchants that pay a fee to the site. Such affiliations undermine the credibility of the information presented to the consumer and obscure any validity of the search or ranking.

Thus, there has been a need for providing consumers with specific information which enables them to make informed decisions. The present invention meets this need.

SUMMARY OF THE INVENTION

An online information system, a method of collecting information on the products and services of merchants, establishing a weighting for comparison information, calculating a ranking of merchants or products based on the weighting of the comparison information, and returning the results of the ranking to the consumer.

In one embodiment of the present invention the weighting factors are input by the consumer, allowing the consumer to customize the ranking to reflect the priorities the consumer places on different factors when making a purchasing decision.

The present invention overcomes the limitations of prior online information systems which did not have the capacity to provide a ranking based on a wide variety of factors related to consumer purchasing habits and decisions. Additionally, the system of the present invention allows consumers to customize the weighting of factors. A present embodiment provides the ability for consumers to select which information items should be considered in the ranking and the weight accorded to the individual information items. Additionally, the present invention provides consumers with the ability to lock the chosen weightings, and to group information items in categories to more easily prioritize categories of information relating to specific concerns of the consumer. Examples of specific concerns are security of the consumer's credit card information, and the reliability of the merchant in delivering the product within a specified time.

These and other purposes and advantages of the invention will be better appreciated from the following detailed description of the invention.

DETAILED DESCRIPTION OF THE PREFERRED EMBODIMENT

The present invention comprises a novel system and method providing a ranking of merchants based on information on the merchants. The following description is presented to enable any person skilled in the art to make and use the invention, and is provided in the context of a particular application and its requirements. Various modifications to the preferred embodiment will be readily apparent to those skilled in the art, and the general principles defined herein may be applied to other embodiments and applications without departing from the spirit and scope of the invention. Although described with reference to certain specific embodiments, those skilled in the art will recognize that the present invention may be practiced with or without some or all of these details. Thus, the present invention is not intended to be limited to the embodiment shown but is to be accorded the widest scope consistent with the principles and features disclosed herein.

Figure 1:
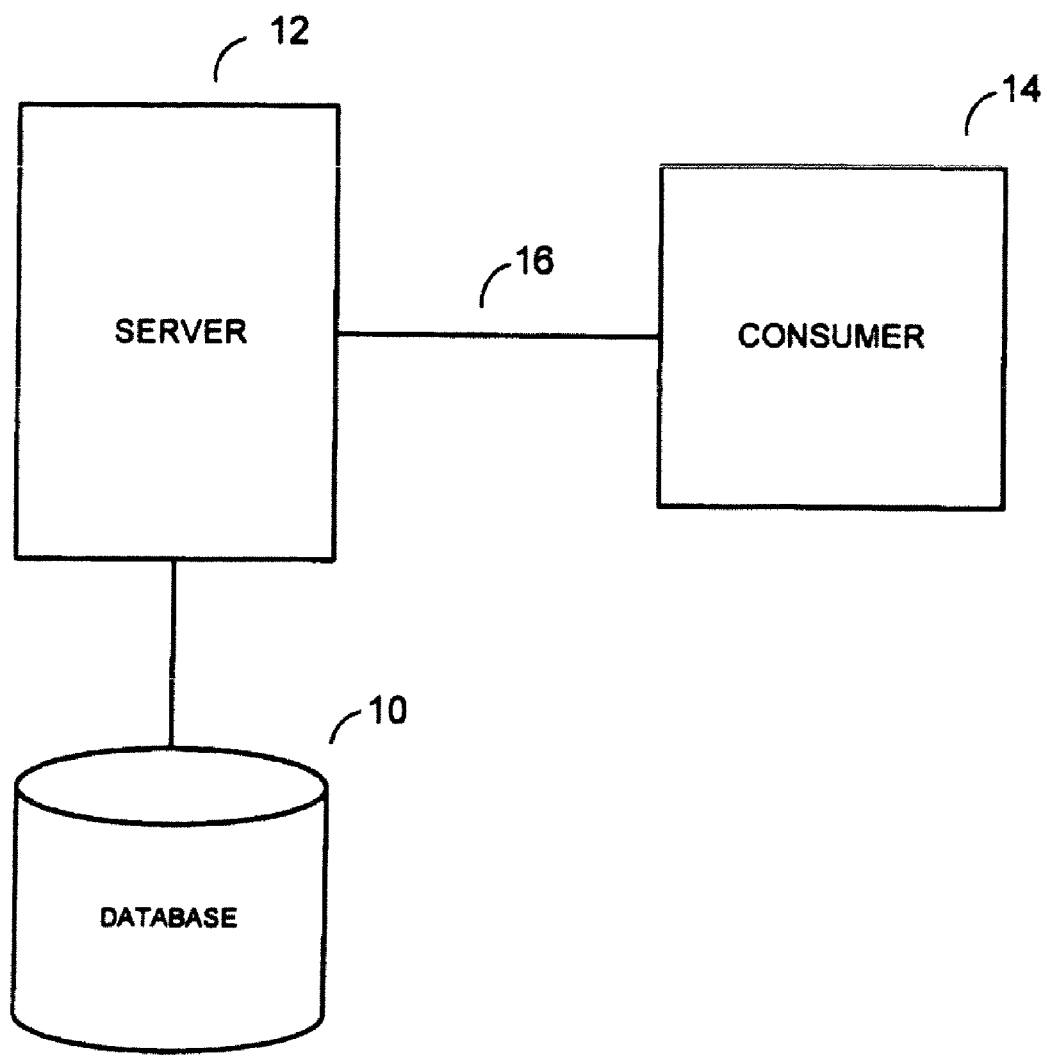
FIG. 1 is an illustrative block diagram of the comparison shopping system, in accordance with the present invention.

Referring to the illustrative block diagram of FIG. 1, information relating to products offered by merchants is stored in the database (10) along with information on the merchants. Additionally, the database stores an initial set of weighting factors. The database (10) is connected to the server (12). The server (12) receives queries from consumers (14) who are located at remote locations and access the server (14) through the internet (16). Consumers typically would use a computer but could use any device capable of connecting to the server (12) to initiate a query and receive a response from a query. This would include, without limitation, a web television device, a personal data assistant, wireless communication device, or other computer.

As used herein, the term "merchants," unless otherwise specified, applies to any provider of a good or service whether or not they are formally organized as a business. The term merchant applies to distributors, producers, organizations, non-profits and potentially individuals, offering a good or service for barter or sale. Similarly, the term "consumer," unless otherwise specified, applies to any person or entity seeking information on a good or service, whether or not there is a specific intention, desire, or ability to purchase or barter for the offered good or service. Unless otherwise specified, the term "product" refers to any good or service which is the subject of commerce.

In response to a query forwarded by the consumer the server requests comparison information from the database relating to both the product specified in the query and the merchants offering the specified product. The server also retrieves weighting factor information from the database. The server applies the weighting factor information to the merchant information and the comparison information on the specified product to calculate weighted comparison factors relating to product and merchant information. A detailed description of the calculation of the weighted comparison factors is provided below in connection with FIG. 3. The weighted comparison factors are summed to an aggregate score for each merchant. The server uses the aggregate merchant score to produce a ranking of the merchants offering the specified product. The server returns the ranking to the consumer through the internet as a response to the consumer's query.

Figure 2A:
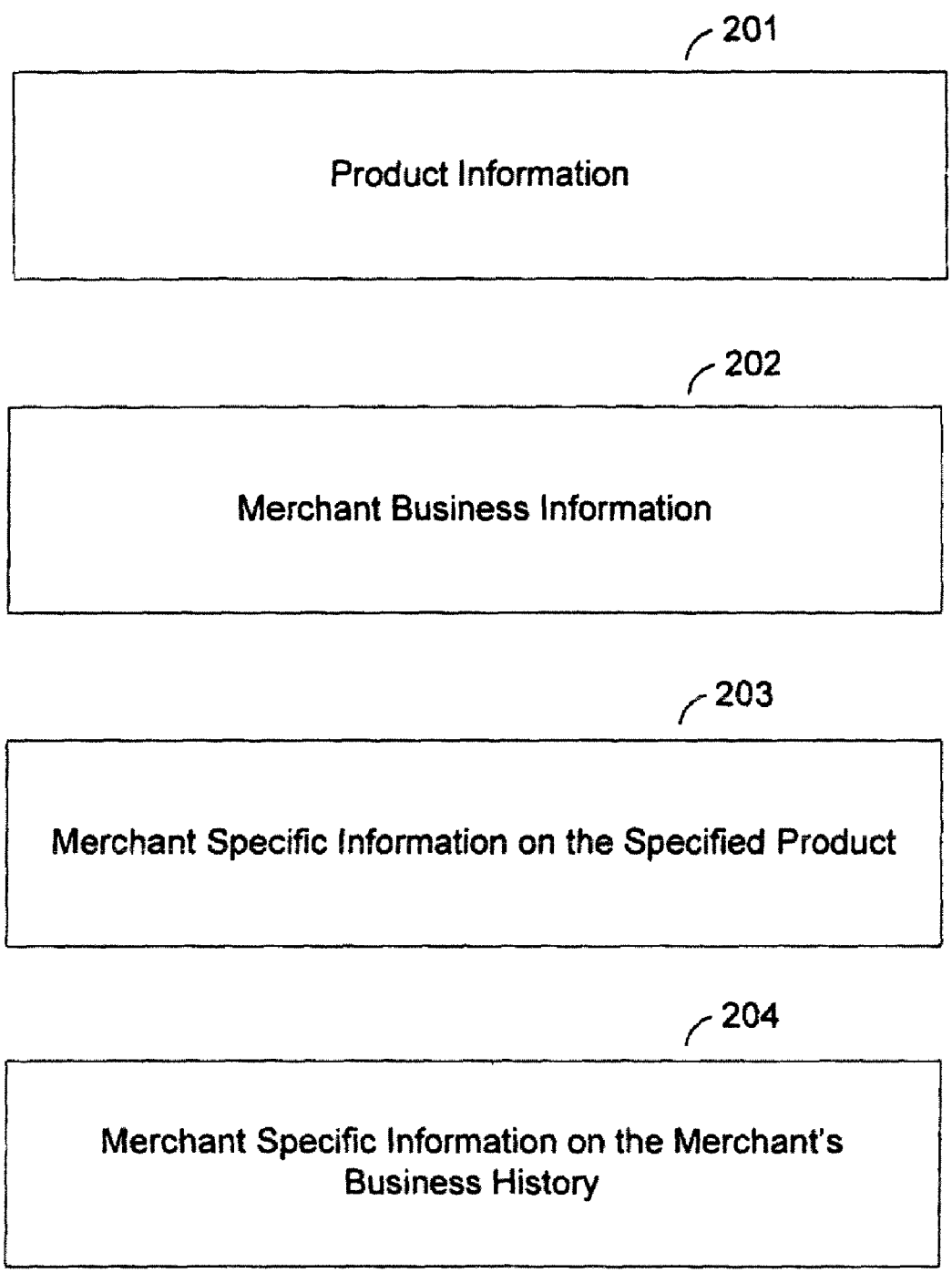
FIG. 2A is an illustrative block diagram of the weighting factors, in accordance with the present invention.

FIG. 2A is a block diagram illustrating categories of comparison information stored in the database. The categories are arranged into four categories: product information (201); merchant's business information (202); merchant specific information on the specified product (203); and merchant specific information on the merchant's business history (204). Product specific information (201) includes the product's manufacturer, the product's model or other identifying information, the product's size or other optional information, the product's color or other design optional information, and the product's suggested retail price from the manufacturer. The merchant's business information (202) includes the merchant's name, address, contact information, and other identifying information, as well as the merchant's status as a business entity.

Figure 2B:
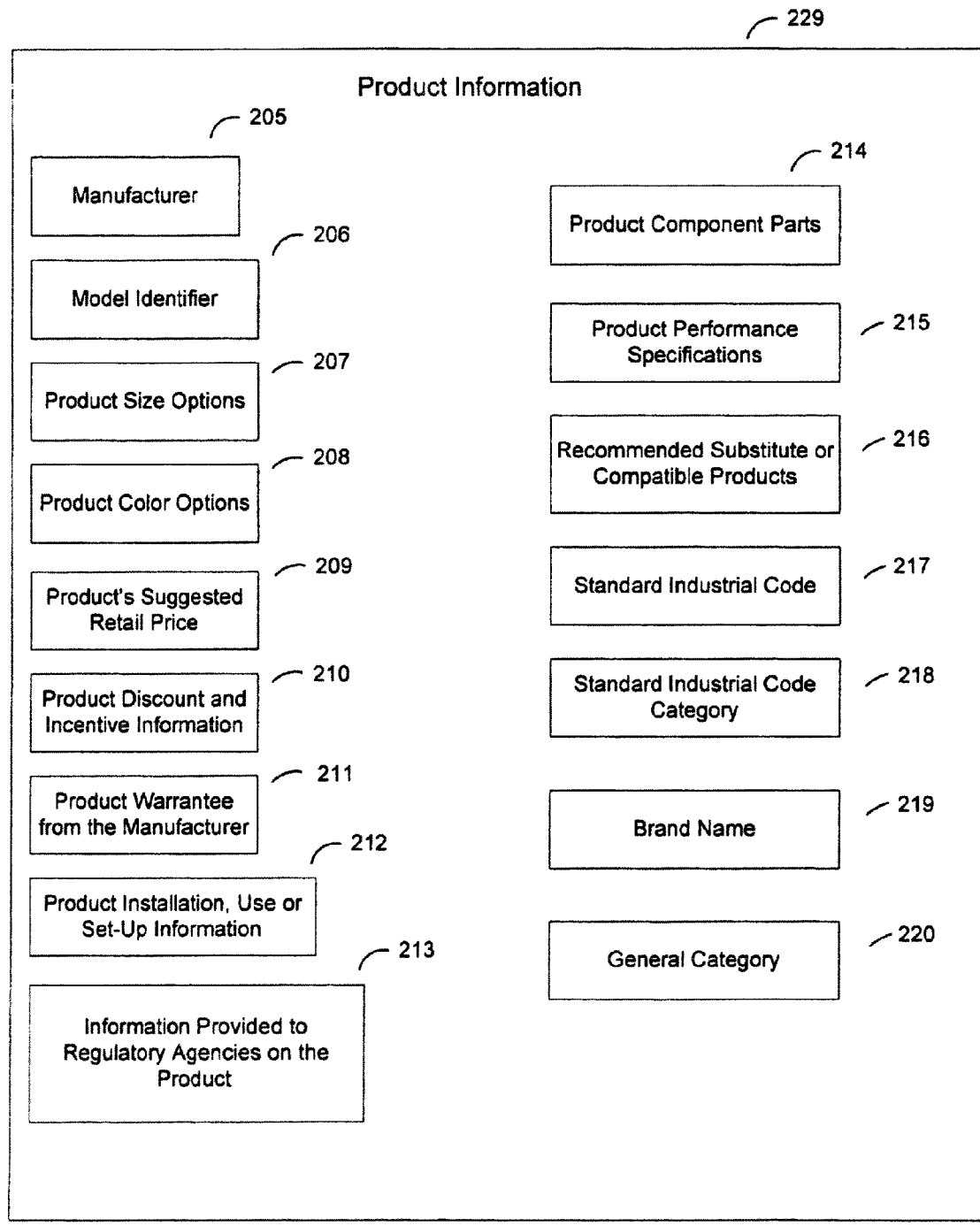
FIG. 2B is an illustrative block diagram of the product specific weighting factors, in accordance with the present invention.

FIG. 2B illustrates examples of product specific information (229) including the product's manufacturer (205), the product's model or other identifying information (206), the product's size or other optional information (207), the product's color or other design optional information (208), the product's suggested retail price from the manufacturer (209); any discount or incentive programs (210) offered by the manufacturer in connection with the specified product; any manufactured warrantee (211) for the specified product, any manufacturer recommendations (212) for installation, use or accompanying products or services; information on the product provided to regulatory agencies provided by the manufacturer (213); product component parts (214); product performance specifications (215); recommended substitutions or compatible products (216); standard industrial code identifier (217); standard industrial code category (218); product brand name or other name identifier (219); and general information (220).

Figure 2C:
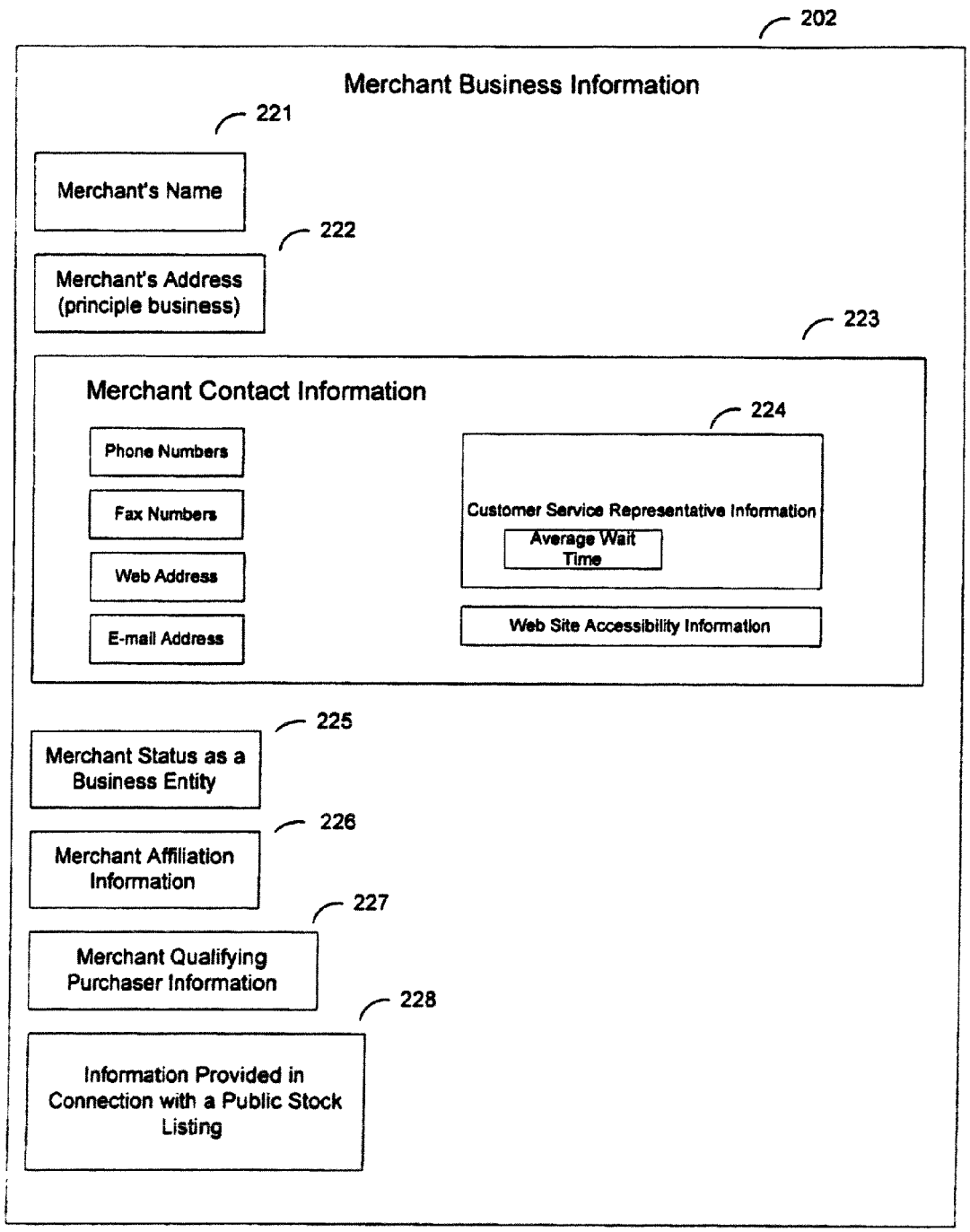
FIG. 2C illustrates examples of weighting factors specific to merchant's business, in accordance with the present invention.

FIG. 2C illustrates examples of merchant specific business information (202) including the merchant's name (221); address (222) of principle place of business including the town or city, county, region, state and country; contact information (223) including addresses of other of the merchant's places of business, other identifying information such as phone numbers, fax numbers, web site URL's, and e-mail addresses including web site accessibility information, and contact information relating to customer service representatives (224); the merchant's status as a business entity (225) such as a corporation, partnership, nonprofit organization, government entity, or individual; information (226) on the merchant's affiliation with other businesses, subsidiaries, parent corporations, government entities, partnerships, joint ventures, or nonprofit organizations, including the nature of the affiliation; whether the merchant is listed on a publicly traded stock exchange; qualifying buyer information relating to what buyer the merchant will sell to (227); and information provided to regulatory agencies in connection with a listing on a publicly traded stock exchange (228).

Figure 2D:
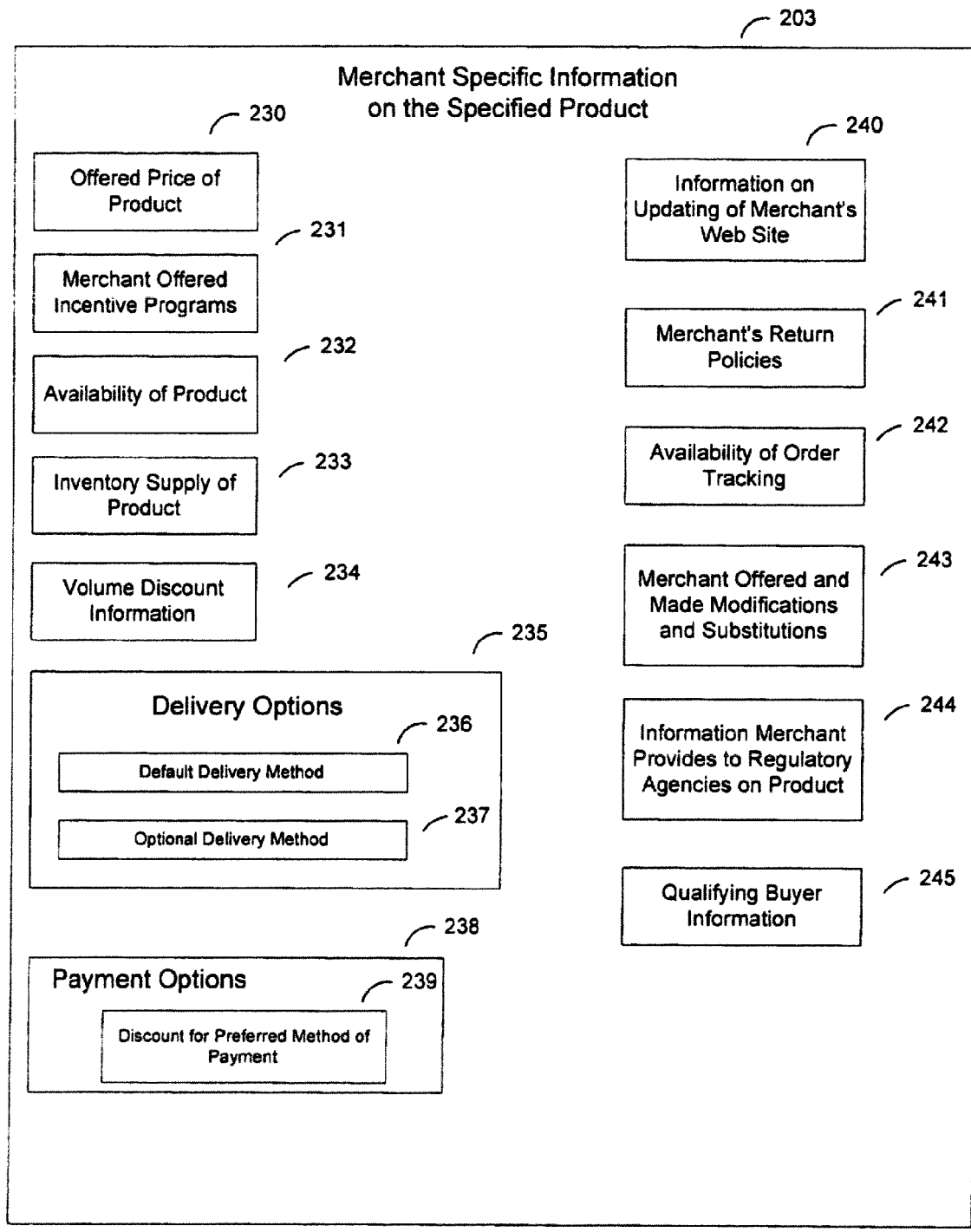
FIG. 2D illustrates examples of merchant specific product weighting factors, in accordance with the present invention.

FIG. 2D illustrates examples of merchant specific information (203) on the specified product including the price (230) the merchant is offering for the good or service; whether there are any present or future discount or incentive programs (231) offered by the merchant in connection with the specified product; whether the product is available (232) for immediate delivery, or performance; number of units of the specified product or the number of instances the specified service can be fulfilled (233); any volume discount's offered (234) on the specified product; the options for delivery (235) of the product, such as download through the internet, courier, mail, delivery service, facsimile, or other; expected cost for delivery of the product, including the default delivery method (236), and information on pricing of optional delivery methods (237); payment options (238), including discount information (239) for using the merchant's preferred payment method; most recent updating of the merchant's web site in relation to the offered product (240); return and refund policies (241) for the specified product; availability of order tracking for the specified product (242), modifications or substitutions (243) the merchant is offering, or has made, to the specified product; information on the product provided to regulatory agencies by the merchant (244) and qualifying buyer information relating to what buyer the merchant will sell the specified product to (245). Qualifying buyer information includes whether the merchant will sell to dealers, individuals, value added resellers, credit qualifications for buyer, licenses or other qualifying information.

Figure 2E:
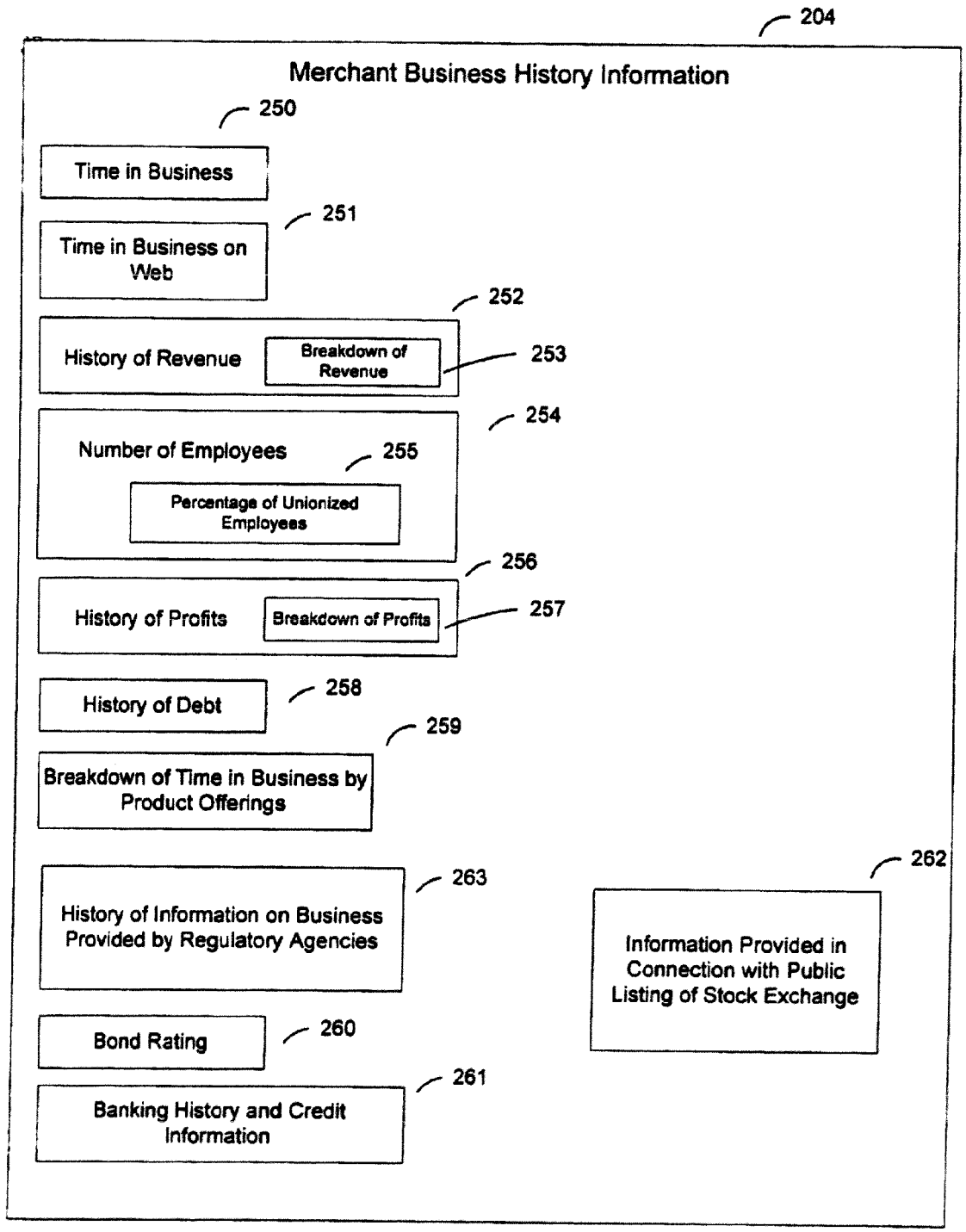
FIG. 2E illustrates examples of weighting factors specific to the merchant's general business history, in accordance with the present invention.

FIG. 2E illustrates examples of merchant specific information on the merchant's general business history (204) including time in business (250); time offering and fulfilling orders on the internet (251); history of revenue (252) of the merchant's business, including breakdown of revenue (253); number of employees (254), including percentage of employees who are unionized (255); history of profits of the merchant's business (256), including breakdown of profits (257) from product and service offerings by the merchant; time in business in the breakdown of revenue in the product and service offerings by the merchant (259); history of debt (258); bond rating (260); banking history (261) and credit information; history of information provided to agencies in connection with a listing on a public stock exchange (262); or other information on the merchant provided to regulatory agencies (263).

Figure 2F:
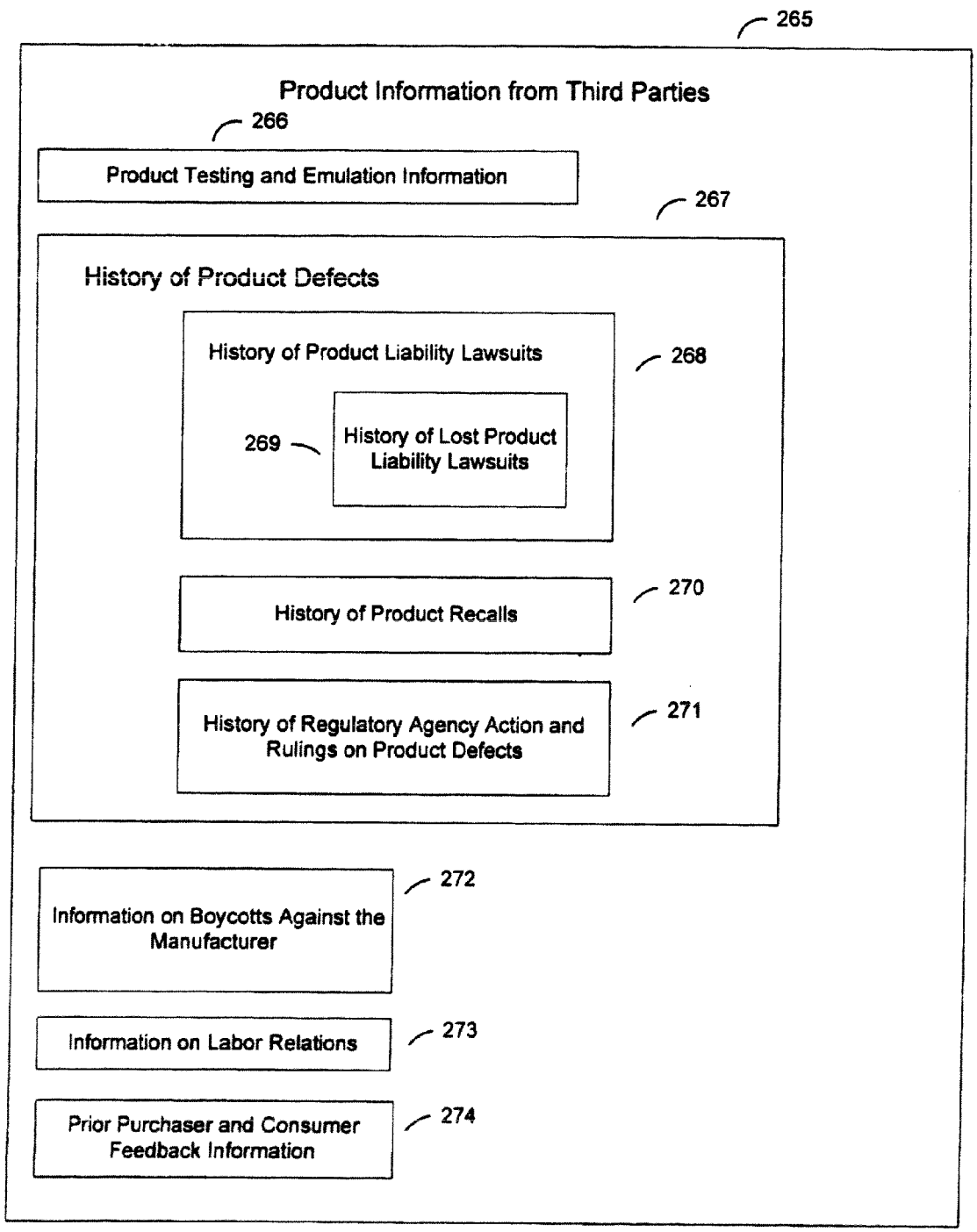
FIG. 2F illustrates examples of weighting factors related to information collected or created by third party agencies and institutions on the specified product, in accordance with the present invention.

FIG. 2F illustrates examples of product, or service, information (265) collected or created by third party agencies and institutions including product evaluation and testing by third parties (266). Also included in the third party product information category is information on the history of product defects (267), including history of product liability lawsuits (268) against the manufacturer for the specified product, including history of lost product liability lawsuits (269); history of product recalls (270); and the history of regulatory agency action and rulings on product defects (271). Also included in the third party product information category is information on the history of boycotts against the manufacturer (272); information on the employer's labor relations (273); and prior purchaser and consumer feedback information (274).

Figure 2G:
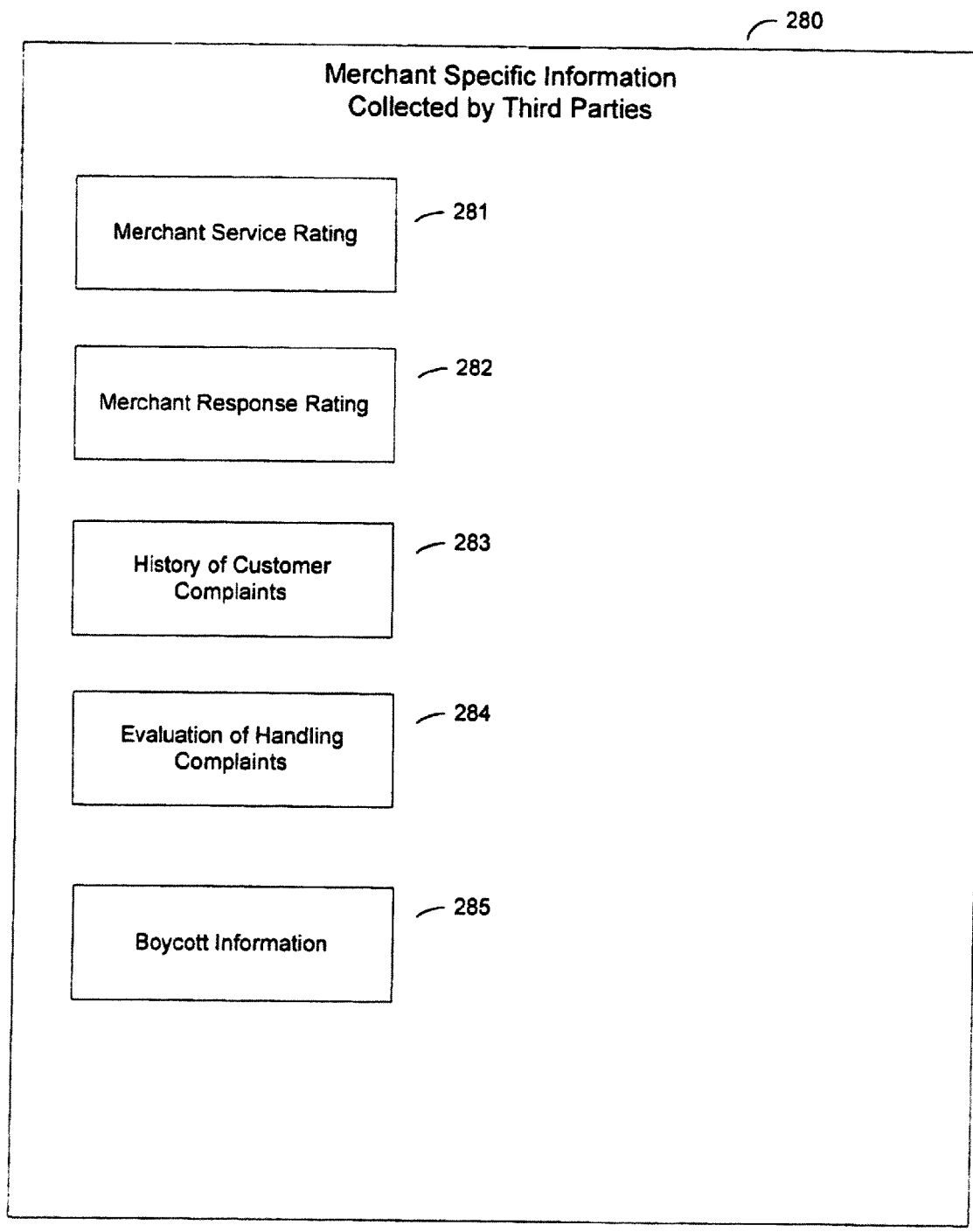
FIG. 2G illustrates examples of weighting factors related to information collected or created by third party agencies and institutions on the merchant, in accordance with the present invention.

FIG. 2G illustrates examples of merchant specific information (280) collected or created by third party agencies and institutions including merchant's service rating (281); merchant's response rating (282); history of complaints by customers (283) to third parties or government agencies; evaluations of the merchant's performance in the handling of customer complaints (284); and information on customer boycotts (285) against the merchant.

Figure 3:
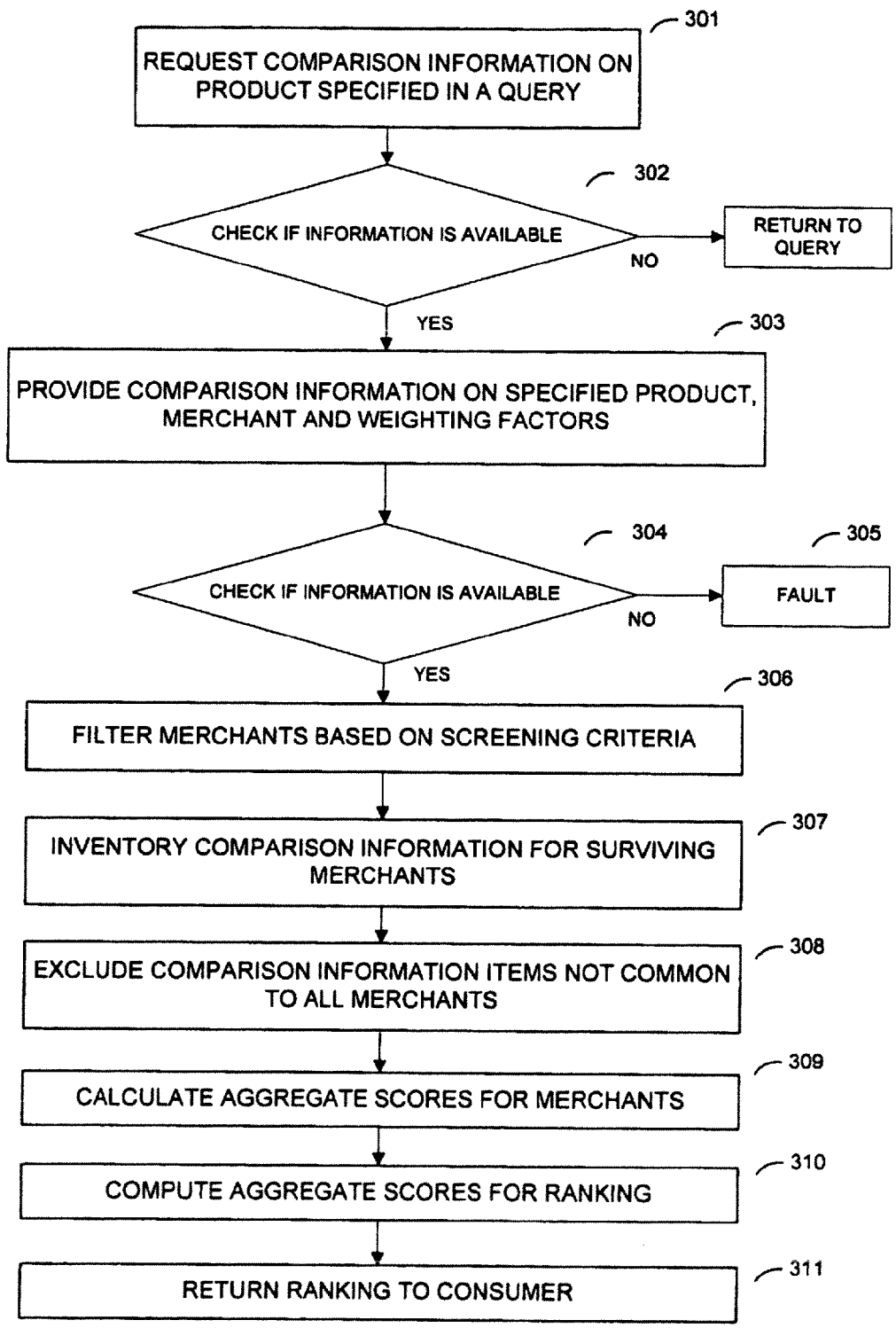
FIG. 3 is a flow diagram illustrating the process of applying the weighting factors to calculate the ranking of merchants, in accordance with the present invention.

The process of applying the weighting factors to the information on the merchant or the specified product is illustrated in FIG. 3. As shown in connection with FIG. 1, the server (12) receives queries from consumers (14) through the internet (16). The server (12) requests comparison information at step (301) from the database (10) to prepare a response to the consumer's query. The server checks whether comparison information is available on the product specified in the consumer's query at step (302). If comparison information is available the process proceeds to step (303) where the database (10) responds to the server's request by providing the comparison information, including weighting factors, to the server. The database will provide comparison information identifying all merchants offering the specified product. The comparison information retrieved from the database includes information relating to the merchant and information relating to the product specified in the query, as well as weighting factors to be applied to this information to produce a ranking or evaluation of each merchant's offering of the product. If at step (304) it is determined that the comparison information is not available, or is insufficient to perform a ranking, then a critical fault is generated at step (305). The server could enter a preset response routine in such instances to notify the consumer of the lack of information and invite the consumer to modify the query. In such an instance a modified query will be submitted to the consumer and the query response will be returned to step (301) and proceed through the process of FIG. 3 accordingly.

If at step (304) it is determined that the information is sufficient for ranking the system proceeds to step (306). At step (306) the system applies a filter to screen any merchants not meeting any selected criteria, Examples of screening information includes any information corresponding to a potential weighting factor as shown in connection with FIG. 3. A consumer could screen merchants by payment method, location, and threshold for number of offered goods, maximum price, affiliation, or other information on the merchant included in the database. Any merchant not meeting the specified filter is excluded at step (306) from further evaluation and weighting. If the merchant meets the filter the method proceeds to step (307) where an inventory is done against the information for each merchant. More particularly, step (307) compares the comparison information to be weighted for the ranking that is available for one or more merchants but is not available for other merchants. If a category of comparison information is not available for one merchant but is available for another merchant the system excludes at step (308) this category of comparison information from the ranking. The system proceeds to step (309) where the weighting factors are applied to the comparison information. Step (309) produces an aggregate score for each merchant which is the sum of the weighting factors applied to the relevant category of comparison information corresponding to the weighting factor. Examples of weighting factors and the process of aggregating the applied weighting factors are discussed in greater detail below in connection with Table 1. Step (310) then compares the merchant aggregate values to determine a ranking. The ranking determined by step (310) is returned to the consumer as a ranking of the merchants who are offering the goods the consumer has specified they are interested in purchasing at step (311).

Table 1 shows examples of weighting factors used in comparing and ranking merchants.

TABLE 1

| Category | For-Profit Companies Factor | Non-Profit Organizations Factor | Individuals Factor |
|---|---|---|---|
| Name | Name of Company dba | Name of Organization dba | Name alias |
| Type | Sole Proprietorship Date Registered Partnership Limited Partnership Limited Liability Corp. S - Corp C - Corp Other SIC code | 501(c)(3) Date Registered NGOs Military Other | Manuf. Rep. Distributor Other |
| History | Starting Date/Inc. Time in Business Time on the Web Credit Rating Credit History Criminal Record Awards | Starting Date/Inc. Time in Business Time on the Web Awards | Credit Rating Credit History Criminal Record Awards |
| Operations | Storefront Catalogue Web Only Some/All Management Personnel # of Employees # of Departments % of Total Operations Board Members | Storefront Catalogue Web Only Some/All Management Personnel # of Employees # of Departments Board Members Trustees # of Members Alliances Major Contributors Rank Cons./Liberal Scale | Storefront Web Only |
| Financials | Gross Revenues % Store % Web P/E P/Book Ratio P/Cash Flow P/L P/R 3 yr. Earnings Growth 1 yr. Earnings Est. % NAV Total Return % +/−S&P 500 +/−Wilshire top 750 Income Return % Capital Return % Total Rtn. % Income $ Capital Gains $ Expense Ratio % Income Ratio % Turnover Rate % | Gross Revenue % Product % Grants Carry Forwards Debt Levels/Type Audited % Funds - Research % Funds - Administration | |

TABLE 1-continued

| | | | |
|---|---|---|---|
| | Total/Net Assets | | |
| | Debt Levels/Type | | |
| | Debt % Market Cap | | |
| | Sur/Def/Rel. to Industry | | |
| | Insider Buying/Selling | | |
| | Mutual Fund Ownership | | |
| | Sensitivity to S&P | | |
| | Short Interest | | |
| | Med Mkt Cap | | |
| | Bankruptcy Filings | | |
| | Mergers | | |
| | Acquisitions | | |
| | Lever Stock Trading | | |
| | Audited | | |
| | Sector Weightings | | |
| Web Site | Design | Design | Design |
| | Accessibility | Accessibility | Accessibility |
| | Last Update | Last Update | Last Update |
| | Secured Site | Secured Site | Secured Site |
| | Security Options | Security Options | |
| | Average Transaction Time | Average Transaction Time | |
| | Certification | Certification | Certification |
| | Child/Porn Locks | Child/Porn Locks | Child/Porn Locks |
| | Age Verification | Age Verification | Age Verification |
| | Visual Capabilities | Visual Capabilities | Visual Capabilities |
| | Photos | Photos | Photos |
| | 3-D | 3-D | 3-D |
| Sales Specifications | Sell to Individuals | Sell to Individuals | Sell to Individuals |
| | Need a Federal ID # | Need a Federal ID # | Need a Federal ID # |
| | Particular Credit Ratings | Particular Credit Ratings | Particular Credit Ratings |
| | Required Deposits | Required Deposits | Required Deposits |
| | Provide Product Specs | Provide Product Specs | Provide Product Specs |
| | Accept Bids | Accept Bids | Accept Bids |
| | Other | Other | Other |
| Products | Name of Product | Name of Product | Name of Product |
| | SIC Code | Publications/Con. | |
| | Manufacturer Code | Surgical Procedure Courses | |
| | | Government Services | |
| | Quality of Product | Quality of Product | |
| | Product Reviews | Product Reviews | |
| | Customizable | Customizable | |
| | Visual Capabilities | Visual Capabilities | Visual Capabilities |
| | Photos | Photos | Photos |
| | 3-D | 3-D | 3-D |
| Services | Customer Service Dept. | Customer Service Dept. | |
| | # number of employ time per call | # number of employ time per call | |
| | # people in front automated service | # people in front automated service | |
| | Order Tracking | Order Tracking | |
| | Returns | Returns | |
| | Guarantee | Guarantee | Guarantee |
| | Other | Other | |
| | Consumer Comments | Consumer Comments | |
| | Complaints | Complaints | Complaints |
| | Languages Offered | Languages Offered | |
| | Spanish | Spanish | |
| | Portuguese | Portuguese | |
| | French | French | |
| | German | German | |
| | Chinese | Chinese | |
| | Japanese | Japanese | |
| | Russian | Russian | |
| | Other | Other | |
| | Overseas Shipping | Overseas Shipping | |
| Price | Price | Price | Price |
| | Lowest | Lowest | Lowest |
| | Negotiable | Negotiable | Negotiable |
| | level of buying | level of buying | level of buying |
| | <100 units | <100 units | <100 units |
| | <1,000 | <1,000 | <1,000 |
| | <10,000 | <10,000 | <10,000 |

TABLE 1-continued

|  |  |  |  |
|---|---|---|---|
|  | <100,000 | <100,000 |  |
|  | <500,000 | <500,000 |  |
|  | <1,000,000 | <1,000,000 |  |
|  | >1,000,000 | >1,000,000 |  |
|  | previous price paid | previous price paid | previous paid |
|  | Shipping Charges | Shipping Charges | Shipping Charges |
|  | Handling Charges | Handling Charges | Handling Charges |
|  | Auction/Bid Option | Auction/Bid Option | Bid/Option |
| Inventory | Inventory Availability | Inventory Availability |  |
|  | Inventory Levels | Inventory Levels |  |
|  | Inventory Turns | Inventory Turns |  |
|  | Fresh Stock | Fresh Stock |  |
|  | Broker From Other Co. | Broker From Other Co. |  |
| Delivery | Delivery Terms | Delivery Terms | Delivery Terms |
|  | Overnight | Overnight |  |
|  | 2 days | 2 days |  |
|  | 7 days | 7 days |  |
|  | 15 days | 15 days |  |
|  | 30 days | 30 days |  |
|  | 3 months | 3 months |  |
|  | 6 months | 6 months |  |
|  | Price Change | Price Change |  |
| Payment | Cash/Check | Cash/Check | Cash/Check |
|  | COD | COD | COD |
|  | Credit Cards | Credit Cards | Credit Cards |
|  | VISA/Mastercard | VISA/Mastercard |  |
|  | AMEX | AMEX |  |
|  | Discovery | Discovery |  |
|  | Other | Other |  |
|  | e-wallet | e-wallet |  |
|  | 30 days | 30 days |  |
|  | 45 days | 45 days |  |
|  | 60 days | 60 days |  |
|  | Letter of Credit | Letter of Credit |  |
|  | Wire Transfer | Wire Transfer | Wire Transfer |
|  | Confidential Credit Info. | Confidential Credit Info. |  |
| Security | Web/Bank Certification | Web/Bank Certification |  |
|  | cert. of authenticity | cert. of authenticity |  |
|  | "public key" crypt | "public key" crypt |  |
|  | fingerprint id | fingerprint id |  |
|  | Secured Sites | Secured Sites |  |
|  | Links | Links |  |
|  | Spam Blocks | Spam Blocks |  |
|  | Age/Site Limits | Age/Site Limits |  |
|  | Confidential Credit Info. | Confidential Credit Info. |  |
| Geography Site location | Name of City | Name of City | Name of City |
|  | Name of County | Name of County | Name of County |
|  | Name of State | Name of State | Name of State |
|  | Name of Country | Name of Country | Name of Country |
|  | Name of Region | Name of Region | Name of Region |
|  | Worldwide | Worldwide | Worldwide |
|  | Other | Other | Other |
| Sales Territory | Name of City | Name of City |  |
|  | Name of County | Name of County |  |
|  | Name of State | Name of State |  |
|  | Name of Country | Name of Country |  |
|  | Name of Region | Name of Region |  |
|  | Worldwide | Worldwide |  |
|  | Other | Other |  |
| Shipping | Name of City | Name of City |  |
|  | Name of County | Name of County |  |
|  | Name of State | Name of State |  |
|  | Name of Country | Name of Country |  |
|  | Name of Region | Name of Region |  |
|  | Worldwide | Worldwide |  |
|  | Other | Other |  |
| Politics | Site location |  |  |
|  | Name of County |  |  |
|  | Government |  |  |
|  | Dem. Rep. |  |  |
|  | Monarchy |  |  |
|  | Cont. Mon. |  |  |
|  | Dictatorship |  |  |
|  | Military |  |  |
|  | Other |  |  |

TABLE 1-continued

| | |
|---|---|
| | Political Stability |
| | War |
| | Border Disputes |
| | Civil War |
| | Protest Move. |
| | Currency Stability |
| | Devaluation |
| | Change |
| | Regional |
| | Trade Alliances |
| | Nafta |
| | EC |
| | SEAC |
| | Product Barriers |
| | Imports |
| | Exports |
| | Tariffs |
| | Member of UN |
| | Inst. Sanctions |
| | IMF |
| | World Bank |
| | UN |
| Social Responsibility | Slave Labor Compliance |
| | Child Labor Compliance |
| | Environmental Compliance |
| | Women-Owned Business |
| | Minority-Owned Business |
| | Product Safety Standards |
| | Class-action Lawsuits |
| | All Natural Products |
| | Other |

| For-Profit Companies | Non-Profit Organizations |
|---|---|
| Rating/InfoService | Rating/InfoService |
| Dun & Bradstreet ™ | NCQA ™ |
| Moody's ™ | Nat. Ency. Associations |
| Standard & Poor's ™ | Inc. Magazine ™ |
| Better Business Bureau ™ | Money Magazine ™ |
| Consumer Reports ™ | Public Policy Schools |
| Federal Trade Commission | State Agencies |
| Securities Ex. Commission | Universities |
| VISA ™ | Healthcare Report Cards |
| AMEXv | Jcaho.org ™ |
| Merrill Lynchv | Other |
| Morningstar ™ | |
| JD Powers ™ | |
| Good Housekeeping ™ | |
| Gomez Advisors Inc. ™ | |
| Internet Broker Scorecard ™ | |
| Improvenet's Cont. Watch ™ | |
| Mobil Restaurant ™ | |
| Zagat's ™ | |
| Fyodors ™ | |
| Others | |

Figure 4A:
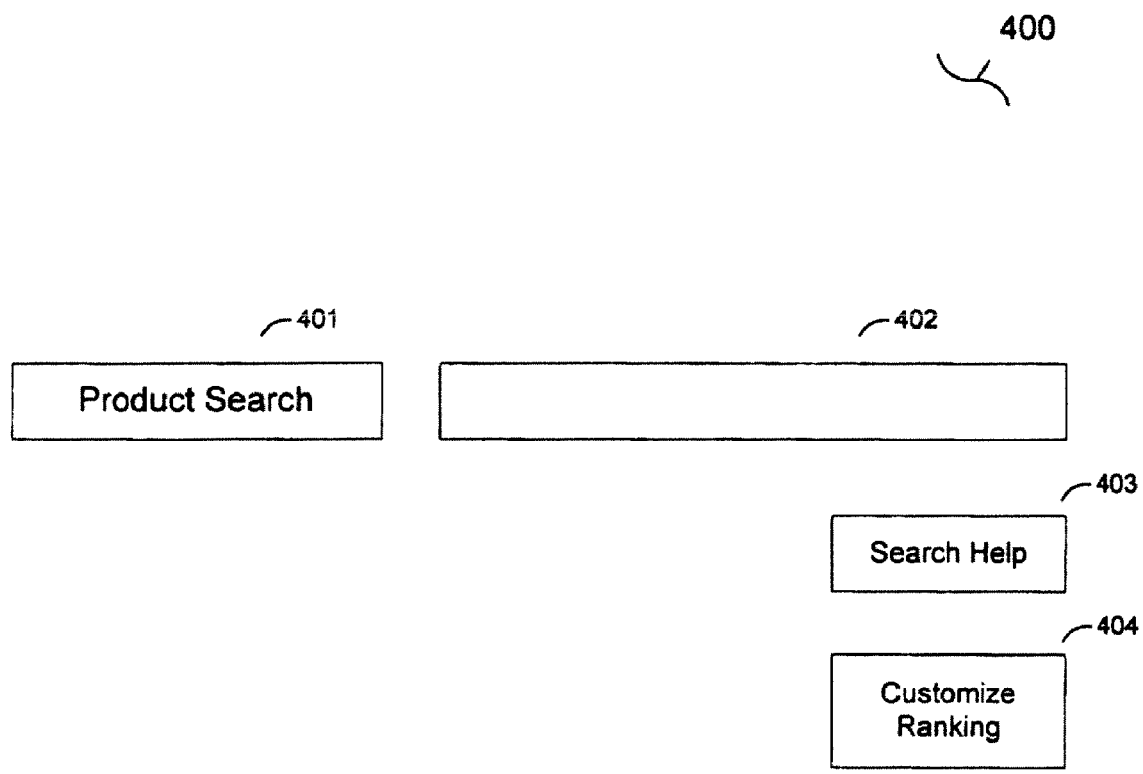
FIG. 4A shows the query page for the consumer to initiate a ranking of merchants offering a specified product, in accordance with the present invention.

FIG. 4A shows a query page (400) where a consumer enters a query for a product to initiate a ranking for merchants offering the specified product. The query tag (401) informs the consumer that they should enter a query for a specified product. The query can be in the form of a Boolean search or a natural language search. The search terms may include the product name, manufacturer name, product model number, the standard industrial code for the product, or any other identifier. The consumer enters the query in query field (402), which is adjacent to the query tag (401). A query help button (403) allows the consumer to request help and instructions in drafting a query. Optionally, a ranking customization button (404) allows the consumer to connect to a weighting factor customization page (410) shown in FIG. 4B.

Figure 4B:
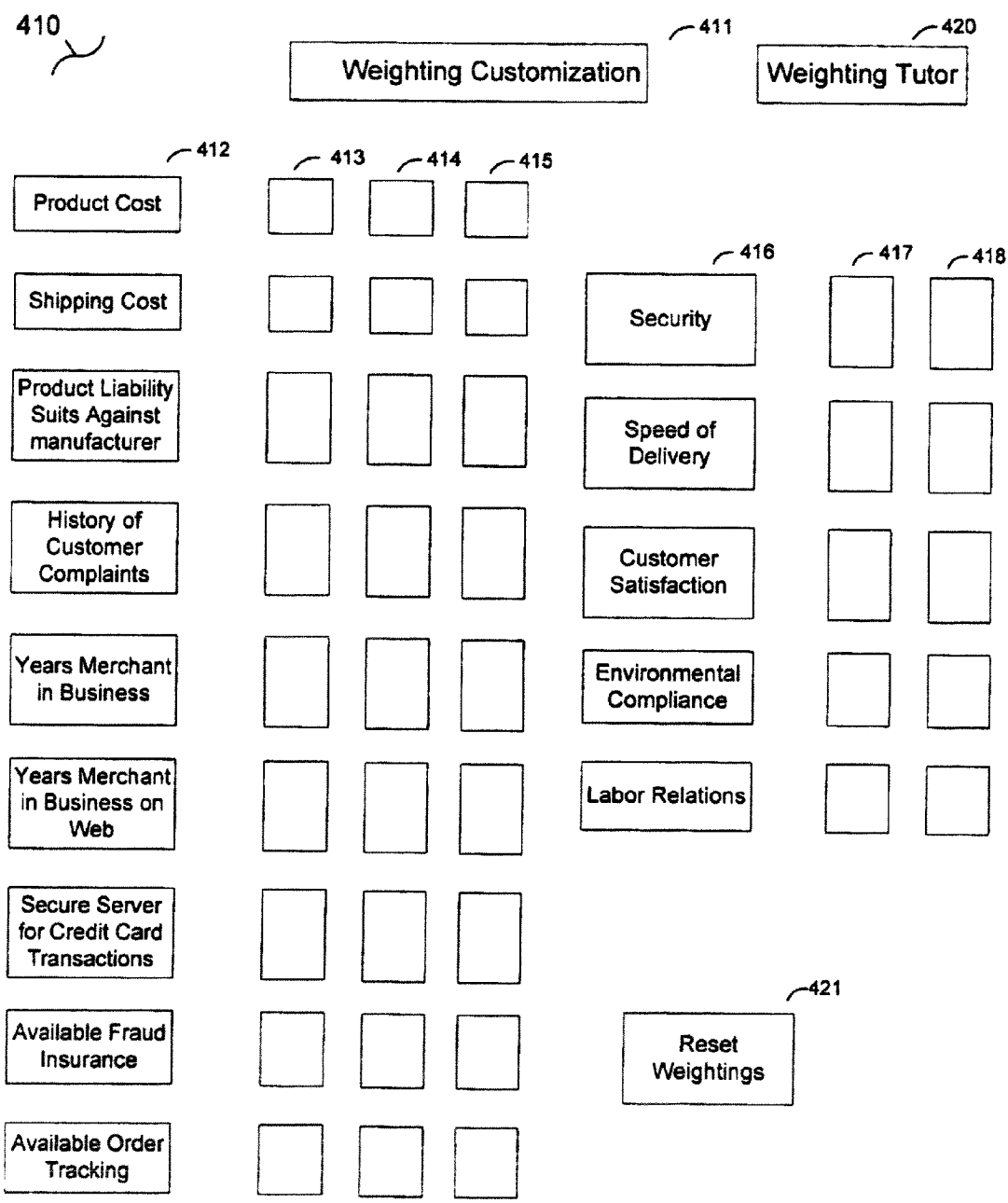
FIG. 4B shows the weighting factor customization page, in accordance with the present invention.

FIG. 4B shows the weighting factor customization page (410), as identified in a page header (411). The weighting factor customization page lists the comparison information which could potentially be relevant to a ranking of merchants offering a product in the comparison information fields (412). Examples of comparison information items are illustrated in FIGS. 2A-2G. Adjacent the comparison fields are weighting fields (413). The consumer may enter their own weighting factors in the weighting fields, thereby ascribing a weighting factor to the item of comparison information in the adjacent comparison fields. Optionally, an initial set of weighting factors could be present in the weighting fields (413), and the consumer could modify the weightings of items of comparison information according to the consumer's preferences. In this manner the present invention allows the system to suggest weighting factors to a consumer while allowing customization of the weighting factors. Optionally, adjacent the weighting fields (413) are weighting field lock (414) indicators which correspond to the adjacent weighting field and comparison information field. The system can lock the weights of some of the comparison information such that the weighting factor can't be altered. In this manner the system protects the user from removing critical pieces of information from the ranking. Optionally, the system locks could be clickable by the consumer to allow the consumer to lock in specific weights such that the system will not rebalance or change them from the user's desired weighting.

Optionally, category fields (415) are adjacent the weighting lock fields (414). The category fields tie together items of comparison information present in the corresponding comparison fields (413). The same given number, character, string, symbol, or other identifier entered in the category fields of two comparison fields indicates to the system that these two items of comparison information are to be includes in the same category. Category tags (416) indicate the available categories of comparison information, such as security, on time delivery, customer satisfaction, environmental compliance, labor relations, etc. Adjacent the category tags (416) are category weighting fields (417). A weighting factor for a category is entered in the category weighting fields (417). By entering the identifier in the category field of two or more items of comparison information, the consumer indicates that the selected comparison information items are to be part of a category having a specific weighting factor, as entered in the category weighting field (417). Any changes to the weighting factors entered in the weighting fields (413) corresponding to comparison information items will not change the weighting of the category of information which the comparison information item corresponds. In this manner the present invention allows a consumer to adjust the relative weights of comparison information items relating to security, while keeping constant the weighting factor for security in the ranking. Optionally, the items of comparison information could be arranged into categories which the user could then customize or eliminate altogether. Another option of the present invention is to allow comparison information items corresponding to the same category to be grouped on the screen. As the user adds or deletes comparison information items from a given category the system could rearrange the comparison information tags, and their associated weighting factor fields, to associate comparison information tags with other comparison information tags in the same category.

Optionally, category weighting locks (418) which correspond to the category tag (416) are adjacent the category weighting fields. The system can lock the weights of some of the categories such that the corresponding category weighting factor can't be altered. In this manner the system protects the user from removing or rebalancing critical categories of information from the ranking. Optionally, the system locks could be clickable by the consumer to allow the consumer to lock in specific weights such that the system will not rebalance or change them from the user's desired weighting.

A weight factor tutor button (420) allows the consumer to request instructions and advice from the system on how to customize the weighting ranking to suit the consumers need. Optionally, the system could suggest different weighting factor paradigms for the consumer. In this manner the system would provide multiple paradigms where the weighting factors are chosen to maximize a particular preference set, while still considering other factors in the merchant ranking. As an example, one weighting factor paradigm could provide a strong emphasis on security, while ranking all other information at a lower, roughly equivalent, level. Another paradigm could give a high ranking to both total cost of the delivered product and to the factors relating to customer satisfaction, giving a secondary ranking to security and on-time delivery, and giving a very low ranking to environmental and labor relation factors. Still another paradigm could give the highest weighting to environmental and labor relations, giving a secondary weighting to both offered price and customer satisfaction, and giving a very low ranking to on-time deliver and delivery options. Accordingly, the system could offer multiple paradigm choices to meet the varied preferences of consumers.

At the bottom of the weighting customization page (410) a weighting reset button (421) allows the consumer to enter the changes they have made, or values they have entered, into the system of the present invention. In response to the consumer clicking on the weighting reset button (421) the system stores the displayed values for use in performing the ranking of merchants.

Figure 4C:
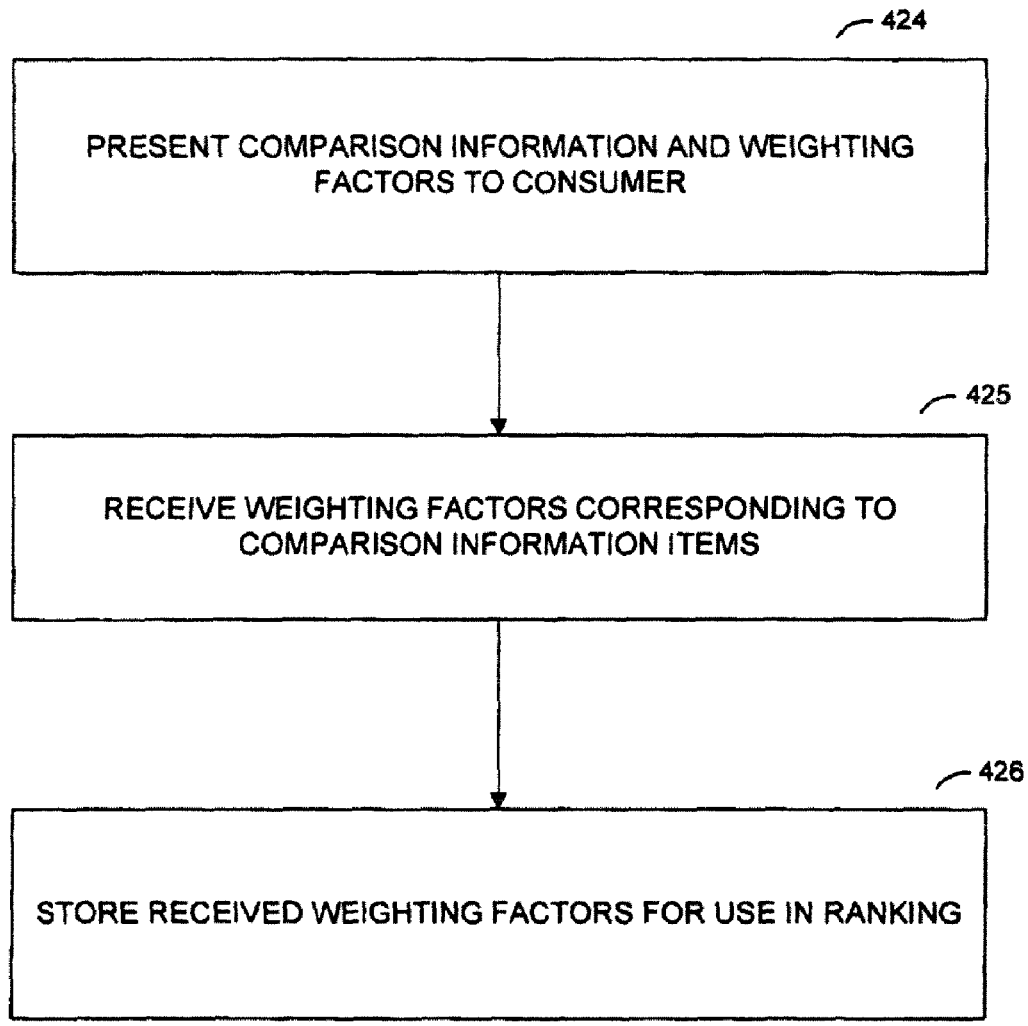
FIG. 4C is a flow diagram of the process of adjusting the weighting factors for the comparison information by the consumer, in accordance with the present invention.
Figure 4D:
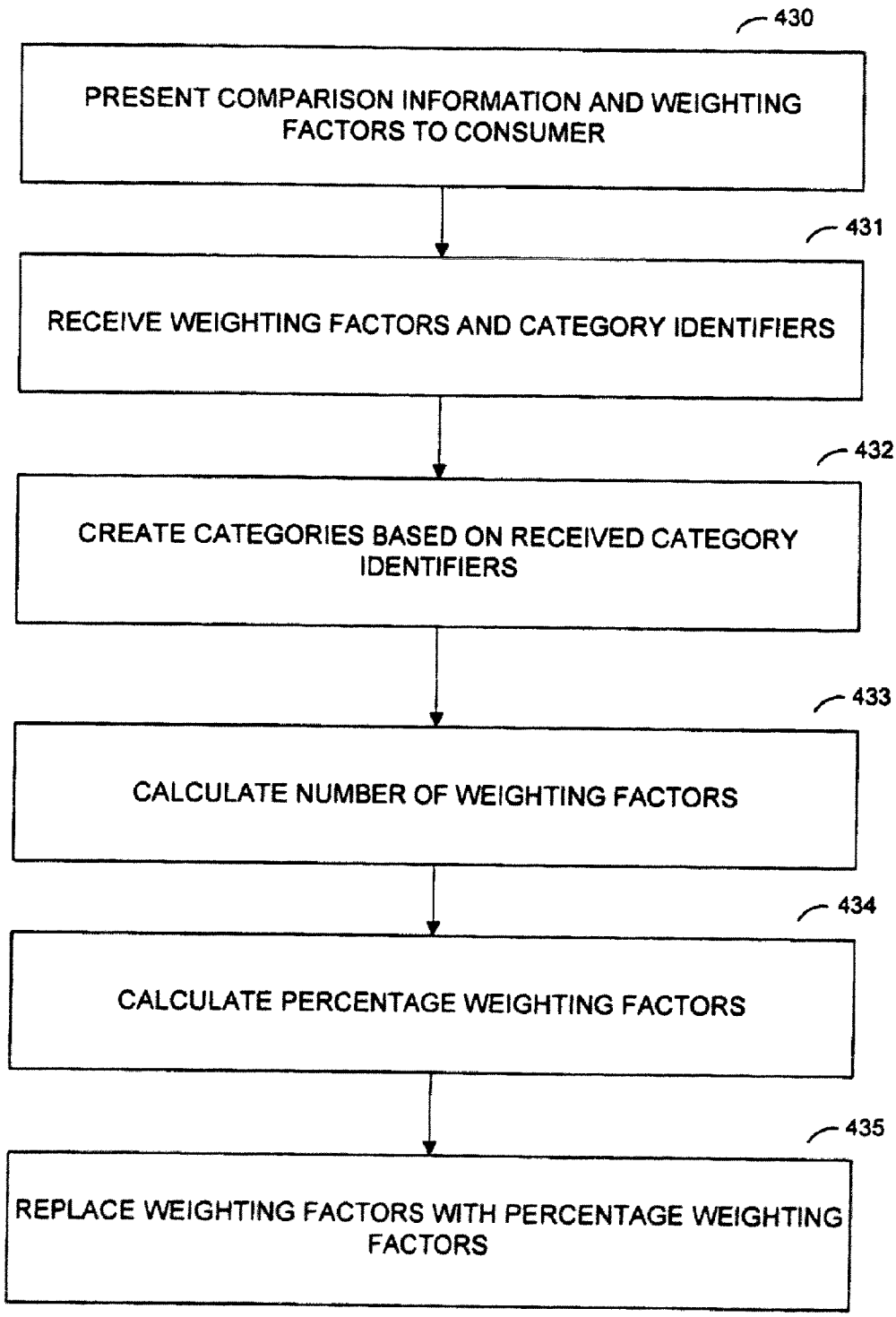
FIG. 4D is a ranking customization screen allowing the weighting of categories of comparison information by the consumer, in accordance with the present invention.

The process of a consumer customizing the weighting factors is shown in FIGS. 4C-D. From the web page the consumer views to enter a query, the consumer may select customization of the factors utilized in ranking merchants. This is done by the consumer clicking on the ranking customization button (404) shown in FIG. 4A. In response to the consumer's clicking on the ranking customization button the system presents the consumer with the weighting factor customization page (410) shown in FIG. 4B. The user is first presented with a choice of weighting factors at step (424). All of the available factors can be presented to the user at once, as illustrated in FIG. 4B, or the user can be presented with categories of factors.

The process of customizing the ranking without the use of categories is shown in FIG. 4C. The system presents the user with comparison information items as shown in FIG. 4B at step (424). The weighting fields (413), which correspond to the comparison information items displayed in the adjacent comparison information fields (412), may either be blank or may display suggested weighting factors to the consumer. The user may enter or modify the weighting factors to reflect the relative weight the user places on the corresponding comparison information item. Weighting factors can be an indication of relative importance to the ranking. For example, the consumer could rank each information item with a 1-5 score with five corresponding to the greatest significance to the consumer, and thereby the greatest relative weight in the ranking, and one corresponding to the least significance to the consumer, and thereby the lowest relative weight in the ranking. Alternatively, the system could allow for weighting factors to correspond to a percentage contribution to the aggregate score of the ranking. In such an embodiment the consumer selects the percentage weight the corresponding information item is to compose out of the total aggregate score for the merchant. In such an embodiment the system performs a total sum for the weighting factors to determine whether the consumer has modified the weighting factors which sum to more than 100% of the total weighting, and notifies the consumer with a warning message that the weighting factors must not sum to more than 100%.

Once the consumer is satisfied with the relative weighting of comparison information the consumer clicks on the weighting reset button (421). In response, at step (425) the system receives the weighting factors displayed when the consumer clicked on the weighting reset button. At step (426) the system saves the weighting factors as modified for use in the ranking for the consumer.

FIG. 4D illustrates the process of customizing the ranking including the use of categories. The system presents the user with comparison information items as shown in FIG. 4B at step (430). The weighting fields (413) and (417) and the category fields (415) corresponding to either, or both, the comparison information and the categories, may either be blank or may display suggested weighting factors to the consumer. The user may enter or modify the weighting factors corresponding to either, or both, the comparison information or the categories. The fields corresponding to the categories fields may either blank or include suggestions on associations for the consumer. As described above in connection with FIG. 4C, the weighting factors may either be an indication of relative importance in the ranking, or reflect a percentage contribution to the aggregate score for the ranking. The consumer may either enter or modify association factors in the category fields (415), as shown in FIG. 4B, to vary, or create, categories according to the consumer's preferences. Once the consumer is satisfied with the relative weighting of comparison information and the relative weighting of categories the consumer clicks on the weighting reset button (421). In response, at step (431) the system saves the weighting factors and category identifiers as modified for use the ranking.

At step (432) the system creates the category associations based on the association factors entered in the category fields (415). At step (433) the system begins the process of calculating categorization weighting factors. In response to the weighting factors entered corresponding to the comparison information items and the categories, along with the entering of the category identifiers, the system must harmonize the weighting factors entered in each field to reflect the consumers desired weighting. For instance, if a consumer selected the security category as having only a ten percent weighting on the overall ranking, and selected credit card security and availability of fraud insurance as the only two comparison information items in the security category, while giving credit card security a high ranking of five and fraud insurance a low ranking of one, the system would calculate categorization weighting factors corresponding to both the credit card security comparison information item and the fraud insurance comparison information item for use in the ranking. At step (434) the weighting factors corresponding to the credit card security and the fraud insurance are converted to percentage values. When weighting factors are expressed a ranking of relative importance, such as a 1 through 5 ranking, the system converts the weighting factors into percentage values based on a predetermined formula. In the presently preferred invention the conversion formula is expressed in steps (433) through (435).

At step (433) the system counts all the weighting factors in each accepted weighting value, and the total number of weighting factors. In the present example, the system would have a total of two weighting factors, one each for credit card security and fraud insurance. The number of each weighting factor is expressed as $N_x$. The system would also have a total of 1 weighting factor of five ($N_5=1$), zero weighting factors of 4 ($N_4=0$), zero weighting factors of 3 ($N_3=0$), zero weighting factors of 2 ($N_2=0$), and one weighting factors of 1 ($N_1=1$). The percentage value for each weighting factor is expressed as $P_x$ where x corresponds to the weighting factor. For example, the percentage weighting factor for five is represented by $P_5$. The formulae the weighting factors satisfy is $$\Sigma P_x N_x = 100\% \quad \text{Eqn. 1}$$

$$P_x > \ldots > P_5 > P_4 > P_3 > P_2 > P_1 \quad \text{Eqn. 2}$$

$$P_x - P_{x-1} = P_{x-1} - P_{x-2} = \ldots P_2 - P_1 \quad \text{Eqn. 3}$$

Equation 1 provides that the total number of weighting factors sum to 100%. Equation 2 provides that the weighting factor corresponding to the more important weighting rank has a higher percentage weighting factor than the lower ranked weighting factors. Equation 3 provides that the step between percentage weighting values is equal between any two neighboring rank weighting factors.

For the present example of x ranging from 1 to 5

$$P_5 N_5 + P_4 N_4 + P_3 N_3 + P_2 N_2 + P_1 N_1 = 100 \text{ or}$$

$$P_5 + P_1 = 100\%, \text{ and}$$

$$P_5 > P_1$$

The preferred weighting is for $P_5=30\%$, $P_4=25\%$, $P_3=20\%$, $P_2=15\%$, $P_1=10\%$. The present system adjusts the weighting factors $P_x$ to with respect to Eqn. 1-3. For the present example, $P_5=70\%$ and $P_1=30\%$.

At step (435) the system replaces the weighting factors stored in the system prior to the customization by the consumer with the percentage weighting factors calculated at step (434).

Figure 5A:
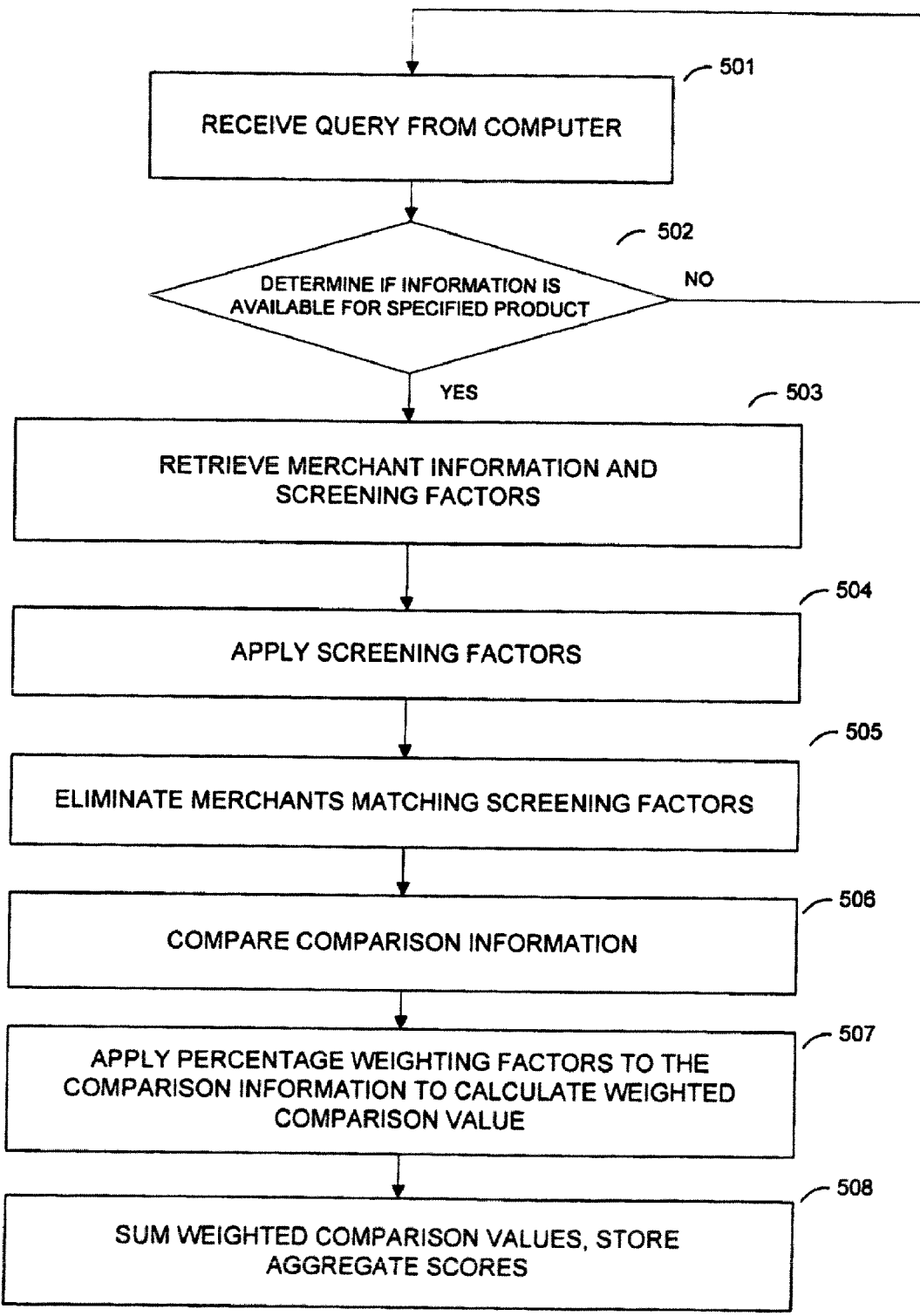
FIG. 5A is a flow diagram of the process of calculating the aggregate value for the merchants in the ranking, in accordance with the present invention.
Figure 5B:
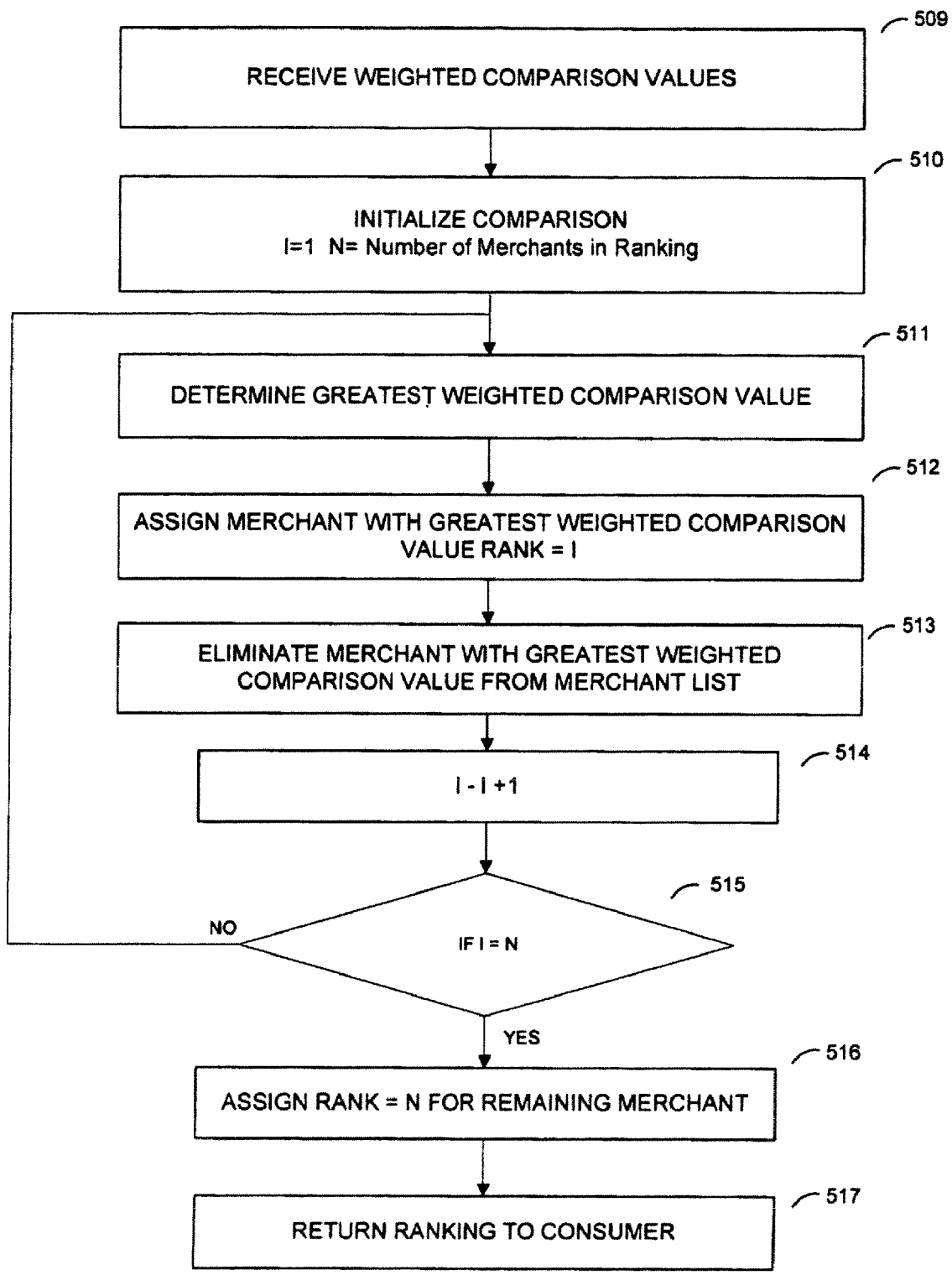
FIG. 5B is a flow diagram of the process of ranking the merchants, in accordance with the present invention.

FIGS. 5A-C illustrates the process of calculating an aggregate score for a given merchant and comparing the aggregate scores to determine a ranking of merchants offering the product specified in the consumer's query. FIG. 5A illustrates the calculation of the aggregate score using the stored merchant weighting factors. Calculation of the aggregate score for a given merchant begins with the input of the query from the consumer at step (501). At step (502) the system checks to determine whether there is information available on the specified product. If information is available, the system proceeds to step (503). If information is not available the system returns the query page to the consumer with a message indicating that no items match the query. The consumer would enter a new, or modified, query at step (501) and repeat the process. At step (503) the system returns from the database all merchants, and their corresponding comparison information, listed as having the specified product, along with screening factors and weighting factor data. Screening factors are applied to the returned merchants at step (504). Merchants who match the screening factors are eliminated from the weighting and ranking process at step (505). Optionally, step (505) could include creating a separate list of eliminated merchants for access by the consumer upon request.

At step (506) the comparison information retrieved at step (503) is compared between the merchants to determine whether the data sets for each merchant are complete. If one or more merchants lack an item of comparison information on a particular aspect of their offering, such as options on shipping or information on consumer complaints, the system has several options to normalize the data. If there are a large number of merchants offering complete, or nearly complete, data sets than any merchant with a partial data set could be eliminated from the ranking. Optionally, this merchant's elimination, the reason for the elimination, and the particular data elements missing from the data set, could be saved for retrieval by the consumer. Alternatively, merchants with incomplete data sets could have their data sets "completed" by giving the merchant the lowest possible value consistent with the corresponding information. For example, information relating to the option of having express overnight delivery for the specified product may receive one point if the merchant offers this delivery option, and zero points if the merchant does not. If this information was missing from the merchant's data set the system could normalize the data set by giving this merchant a zero point value for the express delivery option. Optionally, this lacking of this data value for the particular merchant could be stored and retrieved by the consumer.

At step (507) the system applies the weighting factors to the corresponding comparison information from step (506). The weighting factors, represented as percentage values reflecting the respective contribution of the corresponding weighting factor data, are multiplied by their corresponding comparison information item. The product of this multiplication is a weighted comparison value. The weighted comparison values are summed for each merchant at step (508) to calculate an aggregate score for the corresponding merchant. Optionally, the system also stores the aggregate scores at step (508).

FIG. 5B illustrates the process of comparison and ranking of the merchants. At step (509) the aggregate scores corresponding to the merchants are received from step (508) of FIG. 5A. At step (510) the system initializes the comparison by setting N equal to the total number of merchant's being ranked, and by setting the incrementing variable I equal to the integer one. After the initialization step (510), the system proceeds to step (511) where the greatest weighted comparison value is determined by comparison of weighted comparison values. At step (512) the system assigns the merchant corresponding to the greatest weighted comparison value the rank equal to the incrementing variable I. At step (513) this merchant with the greatest weighted comparison value is eliminated from the ranking. Optionally, step (513) could include creating a separate list of eliminated merchants for access by the consumer upon request. At step (514) the incrementing variable I is incremented by one. At step (514) the system compares the incrementing variable to the number of merchants N to determine if they are equal. If they are not, the system returns to step (511) to determine the greatest weighted comparison value for the merchants remaining in the ranking. If at step (515) I=N, then the system proceeds to step (516) where the remaining merchant is given the ranking equal to N. The system then returns the ranking to the consumer at step (517).

Optionally, the system would also ascribe a star rating to the merchants based on their rating. As described in connection with FIG. 6C, merchants can receive a rating based on their comparison weighting value. In one preferred embodiment of the present invention, the number of stars ascribed to a merchant is based on the merchant being within a set percentage from the greatest weighted comparison value. For example, merchants with a weighted comparison value of no less than 95% of the greatest weighted comparison value would be given the highest rating of five stars. Merchants between 95% and 85% of the greatest weighted comparison value would receive four stars. Merchants between 85% and 75% of the greatest weighted comparison value would receive three stars. Merchants between 75% and 65% of the greatest weighted comparison value would receive two stars. Merchants between 65% and 55% of the greatest weighted comparison value would receive one star. Merchants below 55% of the greatest weighted comparison value would receive no stars.

Alternatively, the ranking could use other break points for ascribing merchants a rating. Alternate embodiments could use other indicators other than stars for rating merchants.

Optionally, the present invention could use the rating system to apply to categories within the ranking. For example, a merchant that received a lower rank in the security category may be given the highest rating due to the small difference between that merchant's weighted security comparison value and that of the merchant with the greatest weighted security comparison value.

Optionally, the present rating and ranking system could be applied to individual comparison information factors. A merchant's specific rank on one comparison factor can be calculated and presented to the consumer.

In this manner the present invention provides detailed comparison information on not only the ranking based on a plurality of factors, which are weighted to reflect their relative importance to a consumer, but also provides relative difference information to indicate when the difference between merchants comparison values are relatively small, or relatively large. The present invention allows both of these comparison features to be presented on the total ranking, the ranking of merchants within a category, and that relative difference for individual comparison factors.

Figure 6A:
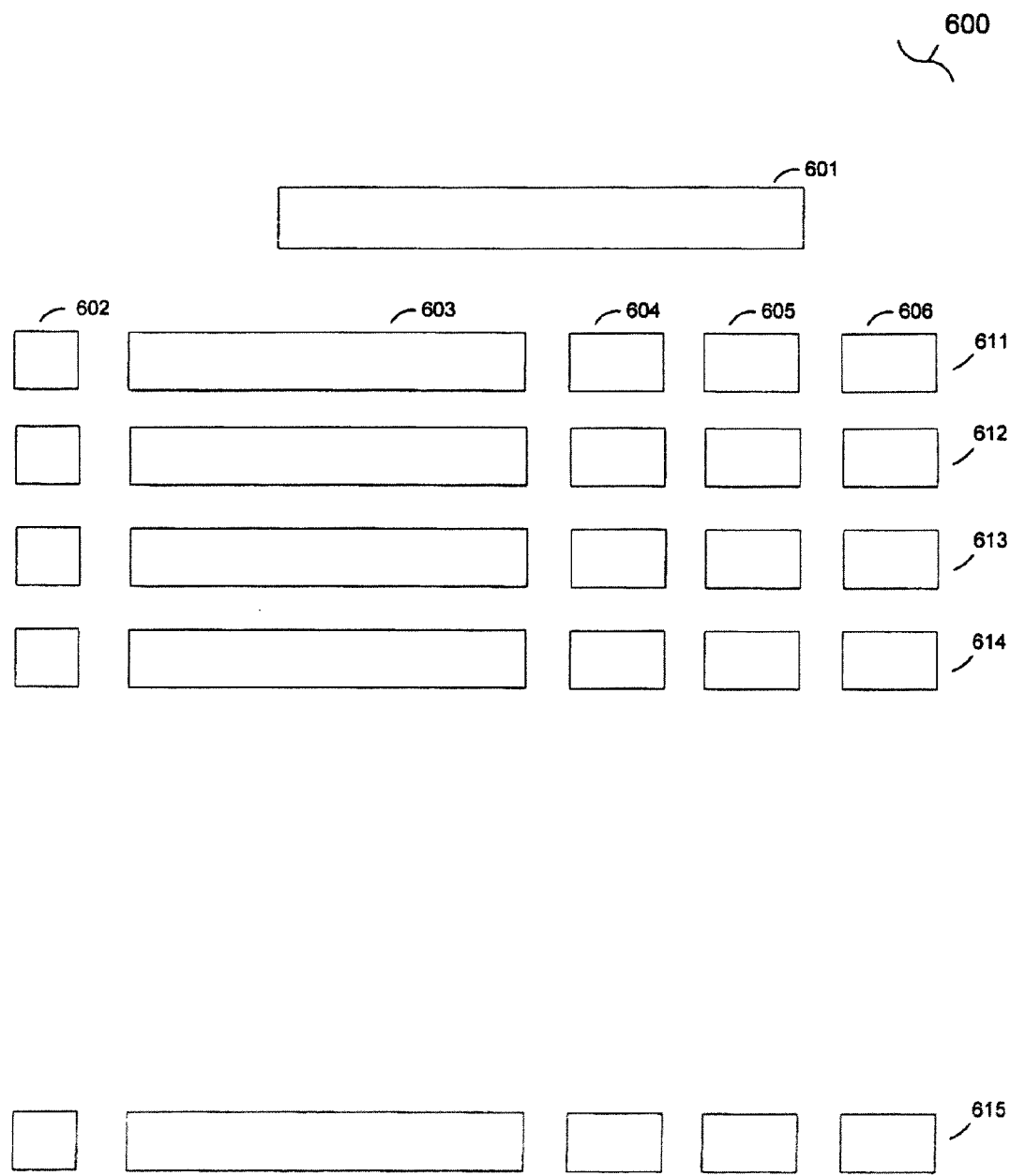
FIG. 6A shows the merchant ranking display providing the ranking of the merchants offering the specified product, in accordance with the present invention.

FIG. 6A shows a display screen for providing the merchant ranking to the consumer. At the top of the display screen (600) the query entered by the consumer is displayed at the query line (601). In the presently preferred embodiment, the merchant with the highest aggregate score is listed at the top merchant line (611), below the query line (601). Alternate embodiments of the present invention could use lowest aggregate score to indicate the highest ranking merchant. In the presently preferred embodiment, the merchant with the second highest aggregate score is listed on a merchant line (612) below the merchant line (611) for the number one ranked merchant. N merchant lines (613)-(615) are provided for the remaining merchants in descending order of their aggregate value from the top of the display to the bottom. If more than a present number of merchants are included in the ranking a continuation of the merchant ranking list could be included on additional display pages.

The merchant line includes a merchant rank block (602) on the leftmost portion of the merchant display line (611). The merchant rank block gives the merchants rank based on the merchant's aggregate value relative to the other merchant in the ranking. A merchant name block (603) is located adjacent to the merchant name block (602) and identifies the merchant through their trade name. An aggregate value total block (604) is adjacent to the merchant name block (603) and displays the aggregate value for the merchant identified in the merchant name block. An offered price block (605) is adjacent to the aggregate value block (604). The offered price block (605) displays the price the merchant in the merchant named in the merchant name block (603) is offering to sell the queried product. Optionally, a rating block (606) is adjacent the offered price block (605) and is located on the rightmost position of the merchant display line (611). The rating block (606) displays the rating given to the merchant in connection with the merchant's aggregate value. All of the blocks (602)-(606) in the merchant display line include information specific to the merchant named in the merchant name block (603).

Figure 6B:
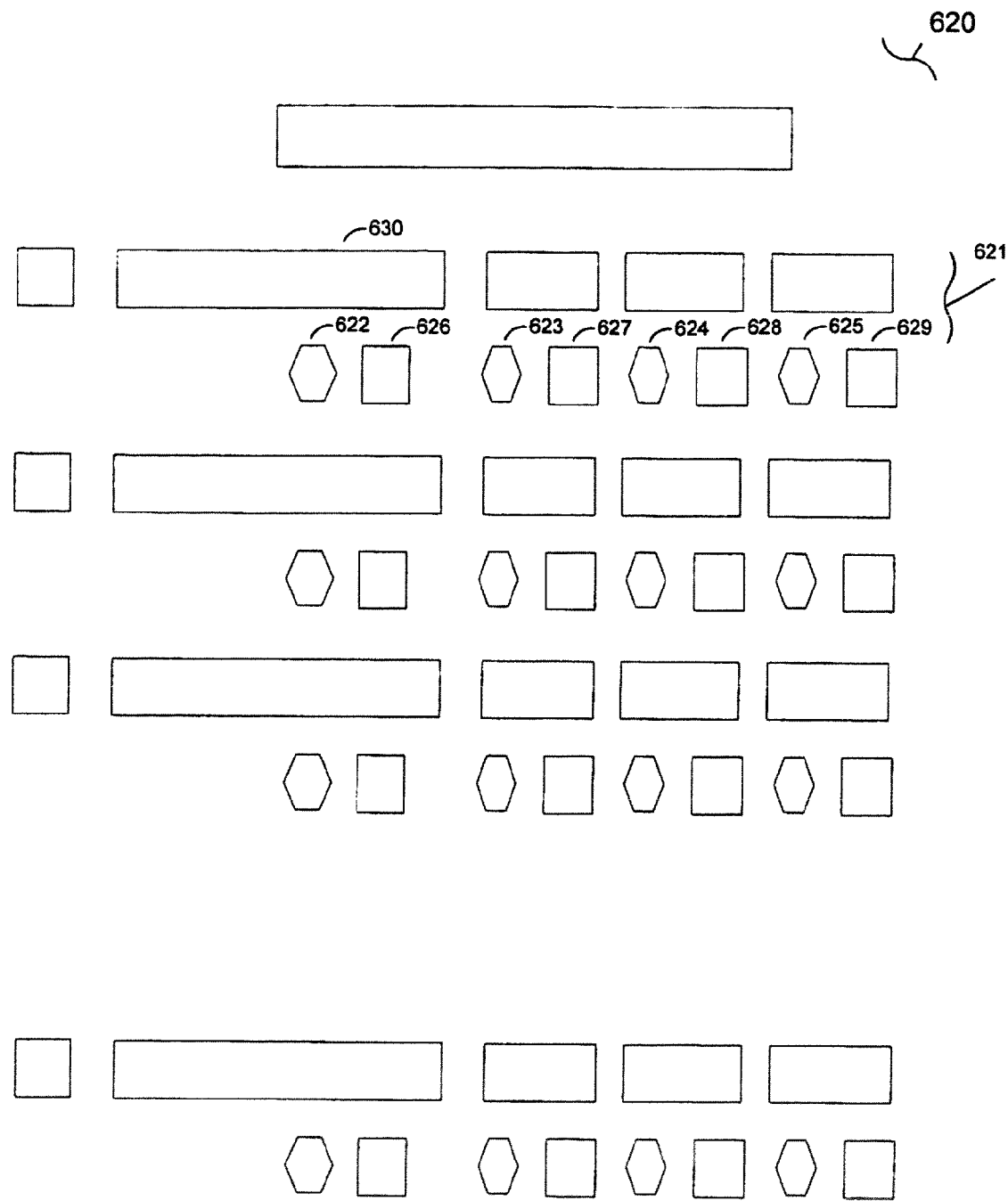
FIG. 6B is an alternate embodiment of the merchant ranking display including additional display features, in accordance with the present invention.

FIG. 6B shows an alternate embodiment of the present invention where the merchant display line (621) includes category icons (622)-(625) corresponding to the categories from the merchant weighting factor display (410) as shown in FIG. 4B. The category icons can include any identifier such as a symbol, name character, etc., alone or in combination, to identify the category of comparison information. Adjacent the category icons are category rank fields (626)-(629). The category rank fields display an aggregate score for only those comparison information items included in the category corresponding to the adjacent category icon. Both the category icons and the category rank fields display information corresponding to the merchant identified by the merchant name block (630) of the merchant display line (621). In this manner, the consumer can see why a particular merchant may receive a lower score, due to one particular category receiving a low score, while other categories receive relatively high scores. This allows the consumer to investigate why the merchant received the low score for the category by clicking on the category icon for the category with the relatively low score. The system then provides a detailed breakdown of the category aggregate score by presenting the page shown in FIG. 6C.

Figure 6C:
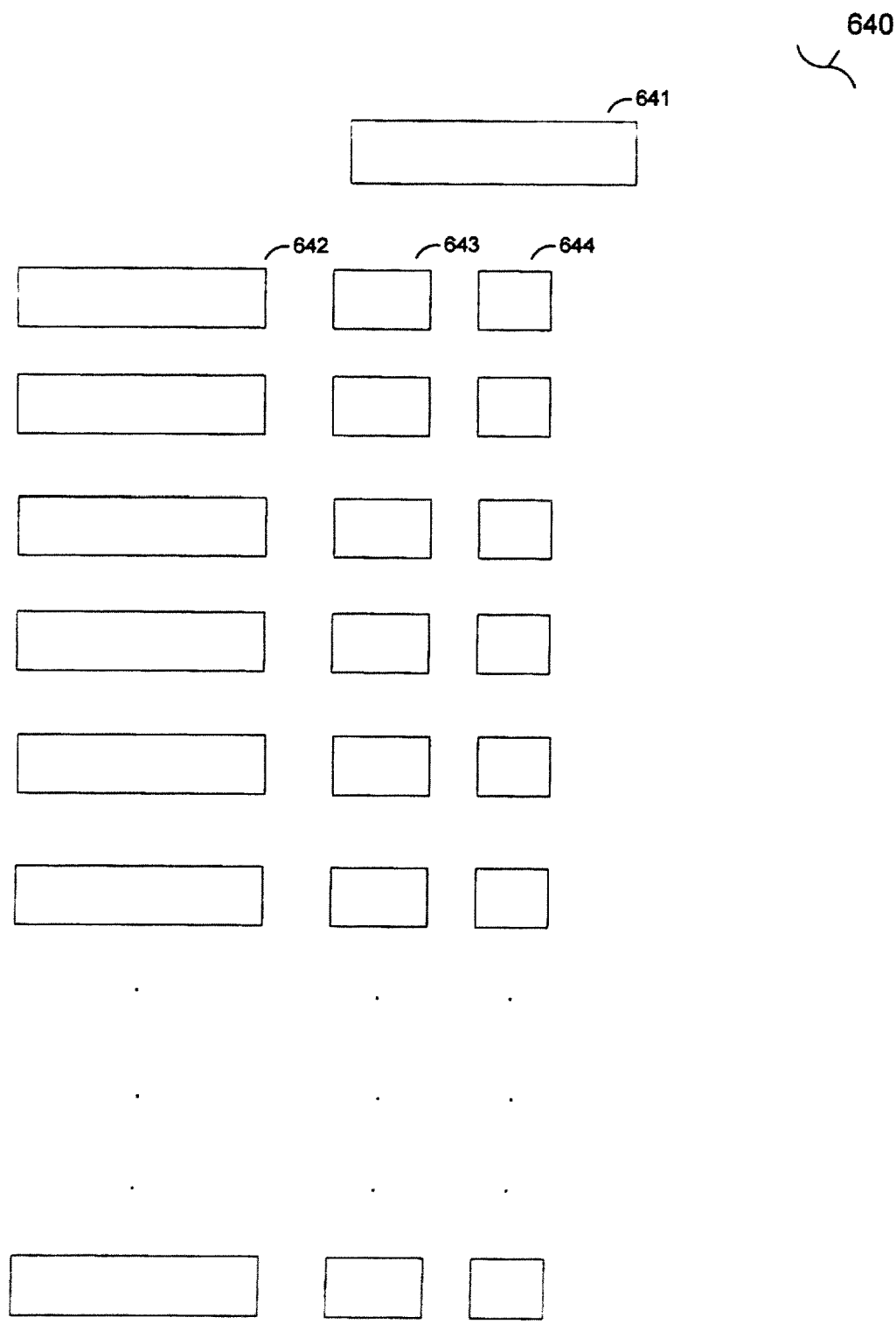
FIG. 6C illustrates the display for the detailed breakdown of the category aggregate score, in accordance with the present invention.

FIG. 6C displays the category identifier (641), which may be the category icon from FIG. 6B or other way of identifying the category to the consumer, at the top of the category breakdown page (640). The comparison information items in the category identified by the category identifier (641) are listed in the comparison information tags (642). Adjacent the category identifier are comparison information item score fields (643). The comparison information item score fields display the score the merchant received when the comparison information item was multiplied by the corresponding weighting factor. Adjacent the comparison information item score field is a comparison information item score relative rank field (644). The comparison information item score field (643) displays the relative rank of the comparison information item score for the merchant with the comparison information item score for other merchants for the same comparison information item. The comparison information item relative rank allows the consumer to identify and evaluate why the merchant was given a low score in the category, by showing the merchant's score for the comparison information items. In this manner the consumer is presented with information which the user may benefit from in making purchasing decisions.

The present invention provides a comparison system which increases the value of the returned results by giving the consumer the tools to inspect the ranking process. The present invention's ability to provide a detailed breakdown of the weighting factors and categories of information used allow the consumer to inspect the ranking process. In this manner the consumer can have confidence that the ranking is based on information about the product and merchant that is relevant to the consumer's purchasing decision. This eliminates the consumer's concerns that the ranking is based on hidden factors that are not aligned with the consumer's interest, such as licensing fees or other promotional fees paid to some of the existing web sites.

The ability of the present invention to allow the consumer to customize the ranking gives the consumer the tools to increase the accuracy, reliability and relevance of the ranking. The present invention allows the consumer the flexibility to personalize the ranking system to reflect their individual priorities when making purchasing decisions. In this manner the present invention reflects the user's priorities, giving the user confidence that the ranking is not based on extraneous factors that are unimportant to the user when making purchasing decisions.

While the present embodiment shows only one database, information on the merchants, offered products or services, and weighting factors could be stored in multiple databases or split amongst multiple databases. The database (10) or databases need not be located at the same facility as the server (12).

Various modifications and improvements to the preferred embodiment can be made without departing from the spirit and scope of the invention. For example, while the system has been described in connection with search for and comparing the offerings of one product from multiple merchants, the present invention could be easily adapted to search for can comparing the offerings from merchants on groups of products, or a "basket" of goods. For example, consumers wishing to lower their monthly grocery bill could specify a basket of goods they are interested in buying, everything from meats and cheeses to fruits and vegetables, and compare merchants offering based on lowest price, reliability of delivery, security of payment, and rankings of the quality of the delivered goods as rated by prior customers, in addition to other information the consumer deems relevant to their intended purchase. As a further example, the present invention is equally applicable to the comparison and ranking of different products. The present invention can allow a consumer to search for two competing products, such as VCRs or automobiles, where the system ranks the offering of two different models by comparing the features and offered terms of sale including price. Depending on the weighting used in the ranking the present invention may return the higher price product as a higher weighting due additional features or other aspects of the product. In this manner the present invention helps to inform the consumer by comparing and ranking based on the consumer's true priorities when making a purchasing decision.

What is claimed is:

1. A machine-implemented method of ranking products, the method comprising:
    receiving, from a consumer using a data processing device, a set of weighting factors pertaining to a query related to a product, at least one of the weighting factors having been input by the consumer prior to execution of the query, the weighting factors corresponding to stored comparison data related to a plurality of products;
    receiving the query;
    accessing the stored comparison data in response to the query;
    generating a ranking, by the data processing device, of the plurality of products based on the set of weighting factors and the comparison data; and
    returning the ranking to the consumer as a response to the query;
    wherein the ranking comprises a list of products and returning the ranking to the consumer comprises causing the list of products to be output to the consumer;
    and wherein the method further comprises:
        for each product in the list, causing, by the data processing device, a plurality of category indicators to be output to the consumer in association with the corresponding product, each category indicator representing a different category of comparison data; and
        causing a corresponding category score or rank to be output to the consumer in association with each said category indicator.

2. A method as recited in claim 1, further comprising:
    receiving from the consumer a user input selecting one of the category indicators; and
    in response to the user input selecting one of the category indicators, causing information representing a detailed breakdown of the corresponding category score or rank of the category to be output to the consumer, wherein said information representing a detailed breakdown of the corresponding category score or ranking includes a plurality of comparison data items for the category and a plurality of corresponding scores or ranks for the data items.

3. A method as recited in claim 1, further comprising:
    receiving from the consumer a user input selecting one of the category indicators; and
    in response to the user input selecting one of the category indicators, resorting the list based on the category corresponding to the selected indicator.

\* \* \* \* \*